United States Patent
Burningham et al.

(10) Patent No.: US 11,272,033 B2
(45) Date of Patent: *Mar. 8, 2022

(54) RECOMPOSING SURVEY QUESTIONS FOR DISTRIBUTION VIA MULTIPLE DISTRIBUTION CHANNELS

(71) Applicant: QUALTRICS, LLC, Provo, UT (US)

(72) Inventors: Wesley Jarrett Burningham, Pleasant Grove, UT (US); Logan John Mosley, Orem, UT (US); Gregory Keith Burnham, Springville, UT (US); Devon S Humes, Provo, UT (US); Nathan John Condie, American Fork, UT (US)

(73) Assignee: Qualtrics, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,684

(22) Filed: Jan. 27, 2020

(65) Prior Publication Data

US 2020/0228624 A1 Jul. 16, 2020

Related U.S. Application Data

(63) Continuation of application No. 14/743,745, filed on Jun. 18, 2015, now Pat. No. 10,547,709.

(51) Int. Cl.
| | |
|---|---|
| *H04L 29/08* | (2006.01) |
| *G06Q 30/02* | (2012.01) |
| *G06Q 30/00* | (2012.01) |
| *H04L 67/60* | (2022.01) |

(52) U.S. Cl.
CPC ............. *H04L 67/32* (2013.01); *G06Q 30/01* (2013.01); *G06Q 30/02* (2013.01); *G06Q 30/0203* (2013.01)

(58) Field of Classification Search
CPC ..... G06Q 30/01; G06Q 30/02; G06Q 30/0203
See application file for complete search history.

(56) References Cited

U.S. PATENT DOCUMENTS

| | | |
|---|---|---|
| 8,606,645 B1 | 12/2013 | Applefeld |
| 8,666,978 B2 | 3/2014 | Moganti et al. |
| 9,581,457 B1 | 2/2017 | Meredith et al. |
| 9,721,386 B1 | 8/2017 | Worley et al. |
| 10,176,640 B2 | 1/2019 | Tierney et al. |
| 10,325,568 B2 | 6/2019 | Whiting et al. |

(Continued)

OTHER PUBLICATIONS

Alex Walz, Rethinking the Mobile Surveys vs. Web Surveys Debate, Apr. 15, 2016, pp. 1-12. (Year: 2015).*

(Continued)

*Primary Examiner* — Tan H Tran
(74) *Attorney, Agent, or Firm* — Keller Jolley Preece

(57) ABSTRACT

Embodiments of the present disclosure relate generally to distributing a survey created for a first distribution channel across multiple distribution channels. More specifically, one or more embodiments of the present disclosure relate to providing a user with the ability to create a survey for one distribution channel and automatically provide the survey across multiple distribution channels. Further, one or more embodiments of the present disclosure improves survey administration by collecting responses to the survey from across the various distribution channels, compiling the responses, and providing the overall results of the survey to the user.

20 Claims, 13 Drawing Sheets

(56) References Cited

U.S. PATENT DOCUMENTS

| | | |
|---|---|---|
| 2002/0036649 A1 | 3/2002 | Kim et al. |
| 2002/0128898 A1* | 9/2002 | Smith, Jr. .......... G06Q 30/0203 705/7.32 |
| 2002/0129052 A1 | 9/2002 | Glazer et al. |
| 2003/0220831 A1* | 11/2003 | Son .................. G06Q 30/02 705/7.32 |
| 2007/0048699 A1 | 3/2007 | MacGregor et al. |
| 2007/0078720 A1 | 4/2007 | Ravikumar et al. |
| 2008/0082394 A1 | 4/2008 | Floyd et al. |
| 2008/0114845 A1 | 5/2008 | Rao |
| 2011/0196801 A1* | 8/2011 | Ellis .................. G06F 16/334 705/321 |
| 2011/0231424 A1 | 9/2011 | Avdanina |
| 2011/0256520 A1 | 10/2011 | Siefert |
| 2011/0289431 A1* | 11/2011 | Olumoko .......... G06Q 30/0203 715/753 |
| 2012/0011006 A1 | 1/2012 | Schultz et al. |
| 2012/0116878 A1 | 5/2012 | Falk et al. |
| 2012/0192235 A1 | 7/2012 | Tapley et al. |
| 2012/0237918 A1 | 9/2012 | Kaida |
| 2012/0310750 A1 | 12/2012 | Schutzbank et al. |
| 2013/0003993 A1 | 1/2013 | Michalski et al. |
| 2013/0044130 A1 | 2/2013 | Geisner et al. |
| 2013/0054435 A1 | 2/2013 | Zhang et al. |
| 2013/0086077 A1 | 4/2013 | Piippo et al. |
| 2013/0173461 A1 | 7/2013 | Levy |
| 2013/0288219 A1 | 10/2013 | Dheap et al. |
| 2013/0293580 A1 | 11/2013 | Spivack |
| 2013/0314421 A1 | 11/2013 | Kim |
| 2013/0330703 A1* | 12/2013 | Chivukula .............. G09B 7/00 434/322 |
| 2013/0335573 A1 | 12/2013 | Forutanpour et al. |
| 2014/0071163 A1 | 3/2014 | Kinnebrew et al. |
| 2014/0129354 A1 | 5/2014 | Soon-Shiong |
| 2014/0139551 A1 | 5/2014 | McCulloch et al. |
| 2014/0214670 A1 | 7/2014 | Mckenna |
| 2014/0225922 A1 | 8/2014 | Sbardella |
| 2014/0278786 A1 | 9/2014 | Liu-Qiu-Yan |
| 2014/0298260 A1 | 10/2014 | Abowd et al. |
| 2014/0306994 A1 | 10/2014 | Brown et al. |
| 2014/0330618 A1 | 11/2014 | Wong et al. |
| 2014/0362111 A1 | 12/2014 | Kim |
| 2014/0375683 A1 | 12/2014 | Salter et al. |
| 2015/0012426 A1 | 1/2015 | Purves et al. |
| 2015/0035861 A1 | 2/2015 | Salter et al. |
| 2015/0046296 A1 | 2/2015 | Hart |
| 2015/0242865 A1 | 8/2015 | Richards |
| 2015/0339453 A1 | 11/2015 | Richards et al. |
| 2016/0055674 A1 | 2/2016 | Mullins et al. |
| 2016/0133154 A1 | 5/2016 | Cortes et al. |
| 2016/0205431 A1 | 7/2016 | Avedissian et al. |
| 2016/0217620 A1 | 7/2016 | Constantinides |
| 2016/0267740 A1 | 9/2016 | Weyl et al. |
| 2016/0277424 A1 | 9/2016 | Mawji et al. |
| 2016/0299563 A1 | 10/2016 | Stafford et al. |
| 2016/0313877 A1 | 10/2016 | Ha et al. |
| 2016/0370954 A1 | 12/2016 | Burningham et al. |
| 2017/0039613 A1 | 2/2017 | Kaehler et al. |
| 2017/0072319 A1 | 3/2017 | Bostick et al. |
| 2017/0180980 A1 | 6/2017 | Courtright et al. |
| 2017/0293958 A1 | 10/2017 | Tang |
| 2017/0323481 A1 | 11/2017 | Tran et al. |
| 2017/0365101 A1 | 12/2017 | Samec et al. |
| 2018/0004283 A1 | 1/2018 | Mathey-Owens et al. |
| 2018/0060883 A1 | 3/2018 | Cheesman et al. |
| 2019/0139318 A1 | 5/2019 | Tierney et al. |

OTHER PUBLICATIONS

U.S. Appl. No. 16/370,157, May 7, 2020, Office Action.
U.S. Appl. No. 15/254,750, Oct. 19, 2020, Office Action.
U.S. Appl. No. 16/241,728, Sep. 9, 2020, Office Action.
U.S. Appl. No. 16/370,157, Aug. 24, 2020, Notice of Allowance.
U.S. Appl. No. 14/743,745, Nov. 2, 2017, Office Action.
U.S. Appl. No. 14/743,745, May 14, 2018, Office Action.
U.S. Appl. No. 14/743,745, May 31, 2019, Office Action.
U.S. Appl. No. 14/743,745, Sep. 18, 2019, Notice of Allowance.
U.S. Appl. No. 14/816,983, Jan. 19, 2018, Office Action.
U.S. Appl. No. 14/816,983, Jul. 27, 2018, Office Action.
U.S. Appl. No. 14/816,983, Dec. 13, 2018, Notice of Allowance.
U.S. Appl. No. 15/226,699, Feb. 23, 2018, Office Action.
U.S. Appl. No. 15/226,699, Sep. 19, 2018, Notice of Allowance.
U.S. Appl. No. 15/254,750, Dec. 26, 2018, Office Action.
U.S. Appl. No. 15/254,750, Aug. 8, 2019, Office Action.
U.S. Appl. No. 15/254,750, Apr. 9, 2020, Office Action.
U.S. Appl. No. 16/241,728, Feb. 25, 2019, Office Action.
U.S. Appl. No. 16/241,728, Oct. 28, 2019, Office Action.
U.S. Appl. No. 16/241,728, Feb. 6, 2020, Office Action.
U.S. Appl. No. 15/254,750, Apr. 1, 2021, Office Action.
U.S. Appl. No. 16/241,728, Jan. 6, 2021, Office Action.
"Pre-Course Key Segment Analysis of Online Lecture Videos" to Che et al, Jun. 23, 2016.
U.S. Appl. No. 15/254,750, Mail Date Dec. 3, 2021, Notice of Allowance.

* cited by examiner

Overall, how satisfied are you with our company? {502a}

○ very satisfied
○ somewhat satisfied
● neutral
○ somewhat dissatisfied
○ very dissatisfied
{502b}

*Fig. 5A*

Overall, how satisfied are you with our company? {504a}

1- very satisfied
2- somewhat satisfied
3- neutral
4- somewhat dissatisfied
5- very dissatisfied
{504b}

*Fig. 5B*

Overall, how satisfied are you with our company? {506a}

1- very satisfied
2- satisfied
3- neutral
4- dissatisfied
5- very dissatisfied
{506b}

*Fig. 5C*

Overall, how satisfied are you with our company? {508a}

1- satisfied
3- neither satisfied or dissatisfied
5- dissatisfied
{508b}

*Fig. 5D*

RECOMPOSING SURVEY QUESTIONS FOR DISTRIBUTION VIA MULTIPLE DISTRIBUTION CHANNELS

CROSS-REFERENCE TO RELATED APPLICATIONS

The present application is a continuation of U.S. application Ser. No. 14/743,745, filed on Jun. 18, 2015. The aforementioned application is hereby incorporated by reference in its entirety.

BACKGROUND

1. Technical Field

One or more embodiments of the present disclosure relate generally to systems and methods for distributing a survey across multiple distribution channels. More specifically, one or more disclosed embodiments relate to systems and methods for distributing a survey created for a first distribution channel across multiple distribution channels.

2. Background and Relevant Art

In general, companies, and even individuals, use surveys, polls, and questionnaires to acquire information and feedback provided by others. For example, a company may use feedback obtained from a customer survey to identify areas where the company can make improvements to the customer experience. For instance, a company can use the opinions and feedback from past customers to improve the experience of current and future customers. As another example, an individual can use responses provided by his or her peers through a poll or questionnaire to gather additional information about a subject or topic of interest to the individual.

The Internet has become a popular distribution channel to administer surveys between users because of the Internet's ability to connect users to each other. To illustrate, a user can create a survey online, distribute the survey to a number of other users via the Internet, and have the other users complete the survey online. When creating and distributing an online survey, a user may employ an online survey system, such as online applications or websites. Further, after a number of respondents complete an online survey, conventional online survey systems can present survey question results to the user.

One problem with conventional survey systems is that a respondent often must access and complete the survey online (e.g., on a website). In particular, conventional survey systems often provide online surveys that are created for respondents to complete using client devices having larger displays (e.g., desktop computers). Commonly, however, respondents are using mobile devices having smaller displays, which often do not properly display conventional online surveys. Accordingly, if a user wants to send out a survey via another electronic communication distribution channel, a user typically must manually create a separate survey for the other distribution channel. For example, if the user desires to send the survey out via an electronic messaging distribution channel, the user usually must manually reconfigure/rewrite the survey questions and/or the survey answer choices in a format that is presentable specifically for the electronic messaging distribution channel.

Having to reconfigure/rewrite a survey and send the survey via alternative distribution channels, however, creates additional problems. For example, in conventional systems, responses that are received from different distribution channels are more difficult to analyze as a whole. For instance, in conventional systems, a user that administers a survey via different distribution channels is often provided with responses grouped together based on the specific distribution channels. Therefore, after receiving responses from various distribution channels, the user must sort through the responses, combine the responses from the various distribution channels together, and organize the results for each question. Often, this process of sorting, combining, and organizing responses from surveys administered through different distribution channels is a manual process that is time consuming, expensive, and prone to error.

Overall, when a user wants to administer a survey using more than one distribution channel, the user must manually customize the survey for each distribution channel, collect responses received from across each of the distribution channels, and organize the responses for each question into a set of results. Thus, when a user desires to administer a survey through more than one electronic communication distribution channel, the user must perform time consuming and expensive steps to set up a survey to be administered for each of the electronic communication channels the user desires to use. Moreover, additional time and expense are needed to combine the responses from the various electronic communication distribution channels. Due to the added time and expense, many users simply choose to not take advantage of the various electronic communication distribution channels, and therefore, limit the reach and effectiveness of a survey.

Accordingly, these and other disadvantages exist with respect to conventional systems and methods for distributing surveys across multiple distribution channels.

SUMMARY

Embodiments of the present disclosure provide benefits and/or solve one or more of the foregoing or other problems in the art with systems and methods for distributing a survey created for a first distribution channel across multiple distribution channels. For example, the systems and methods disclosed herein provide a user with the ability to create a survey for one distribution channel and automatically provide the survey across multiple distribution channels. Further, the systems and methods provide improved survey administration by collecting responses to the survey from across the multiple distribution channels, compiling the responses, and providing a single set of results of the survey to the user, regardless of the particular distribution channel source of each response.

To illustrate, the systems and methods disclosed herein assist a user in composing survey prompts or questions for a survey to be administered on a particular distribution channel, such as an online survey. The systems and methods also allow the user to select an option to administer the survey on one or more alternative distribution channels, such as a message distribution channel. If a user selects the option to distribute the survey on an alternative distribution channel, the systems and methods will automatically recompose one or more survey questions created for one distribution channel to be administered via the alternative distribution channel.

In particular, based on the question type, the systems and methods may recompose (e.g., translate and/or map) a survey question and corresponding answers from an online format to a format better suited to another distribution channel. After recomposing one or more of the survey questions, the systems and methods may provide the survey to respondents via the alternative distribution channel. For example, if the alternate distribution channel is a SMS (short messaging service) distribution channel, the systems and methods may send the survey with one or more recomposed survey questions to the respondents via text message.

Further, the systems and methods can receive responses from respondents via the alternative distribution channel. For example, in the case that the alternative distribution channel is a SMS distribution channel, the systems and methods may receive the responses via text message. Upon receiving the responses, the systems and methods may determine survey answers based on the responses received via text message. The systems and methods may then update the results for the survey with the determined answers.

The survey system may also provide a number of additional benefits over conventional systems. For example, in addition to converting survey questions to suit various distribution channels, the survey system can validate responses received from each distribution channel. Additionally, as another benefit, the survey system may notify a user whether a survey question created for one distribution channel is compatible with another distribution channel. Further, the survey system can facilitate multiple survey sessions with a single respondent at one time via multiple distribution channels.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which.

DETAILED DESCRIPTION

Figure 1:
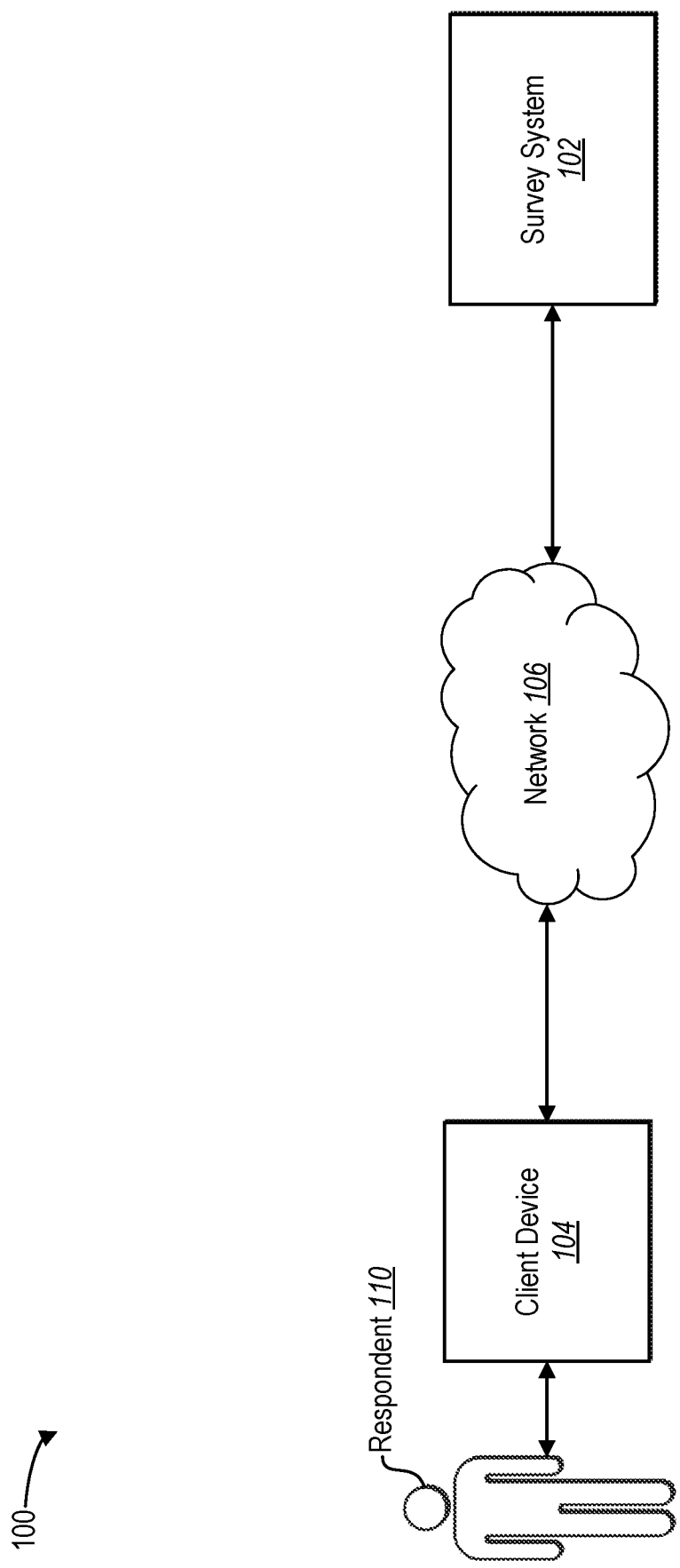
FIG. 1 illustrates a schematic diagram of a communication system in accordance with one or more embodiments.

The embodiments disclosed herein provide a survey system for distributing a survey created for a first distribution channel across multiple distribution channels. In particular, the survey system provides a user with the ability to create a survey for one distribution channel and automatically provide the survey across additional distribution channels. Additionally, the survey enables improved survey administration for a user by collecting responses to a survey from across various distribution channels, compiling the responses, identifying results in each response, and providing survey results to the user.

To illustrate, in one or more embodiments, the survey system receives an indication that a user desires to distribute a survey across a distribution channel that is different from the distribution channel for which the survey was originally created. For example, while creating an online survey, a user may desire that one or more respondents complete the survey via an additional distribution channel. As such, the user may select an option to distribute the survey via the additional distribution channel. In this manner, the survey system may allow the user to create a survey using familiar methods, such as creating an online survey, while still allowing the user to administer the survey over additional or alternative distribution channels, such as email, text, chat, messages, etc.

In some example embodiments, when the user desires to administer the survey via an alternative distribution channel, the survey system identifies one or more questions in the survey to recompose via the alternative distribution channel. In particular, the survey system may identify the question type of each question in the survey. Based on the identified question type for each question in the survey, the survey system may determine whether to recompose the questions to be presented on the alternative distribution channel. For example, the survey system may identify a question as a multiple choice question, and further determine to recompose the question into a format more suitable to be sent via a messaging distribution channel. Alternatively, the survey system may determine that a question is an open-ended question and, therefore, does not need to be recomposed before being sent via the messaging distribution channel.

In addition to recomposing a survey for presentation on an alternative distribution channel, in some embodiments, the survey system may facilitate sending the survey, with one or more recomposed questions, to various respondents via one or more alternative distribution channels. For example, the survey system may directly administer (e.g., send and receive) the survey via a messaging distribution channel. Alternatively, the survey system may communicate with a third-party to administer the survey to the various respondents. For instance, the survey system may communicate with a third-party service that sends and receives messages via one or more alternative distribution channels, such as via a messaging distribution channel.

When a survey response to a survey question is received back, the survey system may validate the response. For example, the survey system may validate that the response corresponds to an active survey. Additionally, the survey system may verify that the response contains a potential answer (e.g., the response is not blank and does not contain incoherent data). Further, in the case that the response is in reply to a recomposed survey question, the survey system may validate that the response correlates to one of the available recomposed answer choices for the recomposed survey question.

After validating a response, the survey system may determine an answer to the survey question. For instance, if the response to the survey question is responding to a survey question that has not been recomposed, the survey system may determine the response contains the answer to the survey. In another instance, however, when the response corresponds to a recomposed survey question, the survey system may determine that the response provides an indication of the actual answer (e.g., the response includes an indication that maps to an available answer choice to the survey question). In this instance, the survey system may use the indication of the answer to identify the actual answer to the survey question. Additional detail regarding the process of determining an answer to a survey question using a response to a recomposed survey question will be provided below.

Once the survey system receives and/or determines an answer, the survey system may update the results of the survey with the answer. In some example embodiments, the survey system may send out the next question in a survey after receiving a valid answer for a previous question. In addition, the survey system may compile answers from various respondents and update the survey results. Further, the survey system may collect results from across different distribution channels and present the overall results to the user that created the survey.

As mentioned above, the survey system described herein can provide a number of advantages. To illustrate, one or more embodiments of the survey system allows a user to create a survey for a single distribution channel, and then distribute the survey over multiple distribution channels without the user needing to manually customize the survey format or content for the other distribution channels. As another benefit, the survey system also collects responses from across multiple distribution channels and compiles the results together as a whole, without the user needing to manually intervene to combine responses and answers from the different distribution channels.

As used herein, the term "survey" refers to an electronic communication used to collect information. For example, a survey may include an electronic communication in the form of a poll, questionnaire, census, or other type of sampling. In some example embodiments, the term survey may also refer to a method of requesting and collecting information from respondents via an electronic communication distribution channel. As used herein, the term "respondent" refers to a person who participates in, and responds to, a survey.

A survey may include survey questions. As used herein, the term "survey question" refers to prompts included in the survey that invoke a response from a respondent. Example types of questions include, but are not limited to, multiple choice, open-ended, ranking, scoring, summation, demographic, dichotomous, differential, cumulative, dropdown, matrix, net promoter score (NPS), singe textbox, heat map, and any other type of prompt that can invoke a response from a respondent. In one or more embodiments, when one or more answer choices are available for a survey question, the term survey question may comprise a question portion as well as an available answer choice portion that corresponds to the survey question. For example, when describing a multiple choice survey question, the term survey question may include both the question itself as well as the multiple choice answers associated with the multiple choice question.

As used herein, the term "response" refers any type of electronic data provided by a respondent. The electronic data may include feedback from the respondent in response to a survey question. Depending on the question type, the response may include, but is not limited to, a selection, a text input, an indication of an answer, an actual answer, and/or an attachment. For example, a response to a multiple choice question may include a selection of one of the available answer choices associated with the multiple choice question. As another example, a response may include a numerical value, letter, or symbol that that corresponds to an available answer choice. In some cases, a response may include a numerical value that is the actual answer to a corresponding survey question.

The term, "distribution channel," as used herein, refers generally to an electronic communication channel. Examples of distribution channels may include wired or wireless channels, such as online connections, electronic mail, and electronic messages (e.g., instant messages, text messages, multi-media messages, chat, etc.). In some embodiments, a distribution channel requires using a specific protocol when sending electronic data via the distribution channel. As a result, electronic data may need to be converted to a specific type of protocol before being sent over a corresponding distribution channel. For example, electronic data being sent to a mobile device via a SMS distribution channel must be based on SMS protocol before the electronic data can be sent via the SMS distribution channel.

FIG. 1 illustrates a schematic diagram of a communication system 100 in accordance with one or more embodiments. As illustrated, the communication system 100 includes a survey system 102 and a client device 104. The survey system 102 may connect to client device 104 via a network 106. Although FIG. 1 illustrates a particular arrangement of the client device 104, the survey system 102, and the network 106, various additional arrangements are possible. For example, the survey system 102 may directly communicate with the client device 104, bypassing the network 106.

As mentioned, the survey system 102 and the client device 104 may communicate via the network 106. The network 106 may include one or more networks, such as the Internet, and may use one or more communications platforms or technologies suitable for transmitting data and/or communication signals. Additional details relating to the network 106 are explained below with reference to FIGS. 11 and 12.

As illustrated in FIG. 1, a respondent 110 may interface with the first computing device 220a, for example, to access the survey system 102. The respondent 110 may be an individual (i.e., human user), a business, a group, or other entity. Although FIG. 1 illustrates only one respondent 110, one will understand that communication system 100 can include a plurality of respondents, with each of the plurality of respondents interacting with the communication system 100 using a corresponding client device.

The client device 104 may represent various types of computing devices. For example, the client device 104 may be a mobile device (e.g., a cell phone, a smartphone, a PDA, a tablet, a laptop, a watch, a wearable device, etc.). In some embodiments, however, the client device 104 may be a non-mobile device (e.g., a desktop or server; or another type of client device). Additional details with respect to the client device 104 are discussed below with respect to FIG. 11.

In one or more embodiments, the survey system 102 may communicate with the respondent 110. In particular, the survey system 102 may send a survey (e.g., questions or prompts associated with a survey) to the respondent 110 via the network 106. More specifically, the survey system 102 may send the survey to the respondent 110 via the network 106 using a variety of distribution channels. For instance, the survey system 102 may send a survey via an online distribution channel (e.g., through a website). In another instance, the survey system 102 may send a survey via a messaging distribution channel (e.g., in a chat, text, instant message, etc.).

In response, the respondent 110 may interact with the survey system 102 to complete the survey. In one or more example embodiments, the respondent 110 may respond to the survey using a mobile device or tablet client device. In alternative embodiments, the respondent 110 may used a laptop or desktop client device. In some example embodiments, the respondent 110 may use a combination of client devices to respond to a survey.

Figure 2:
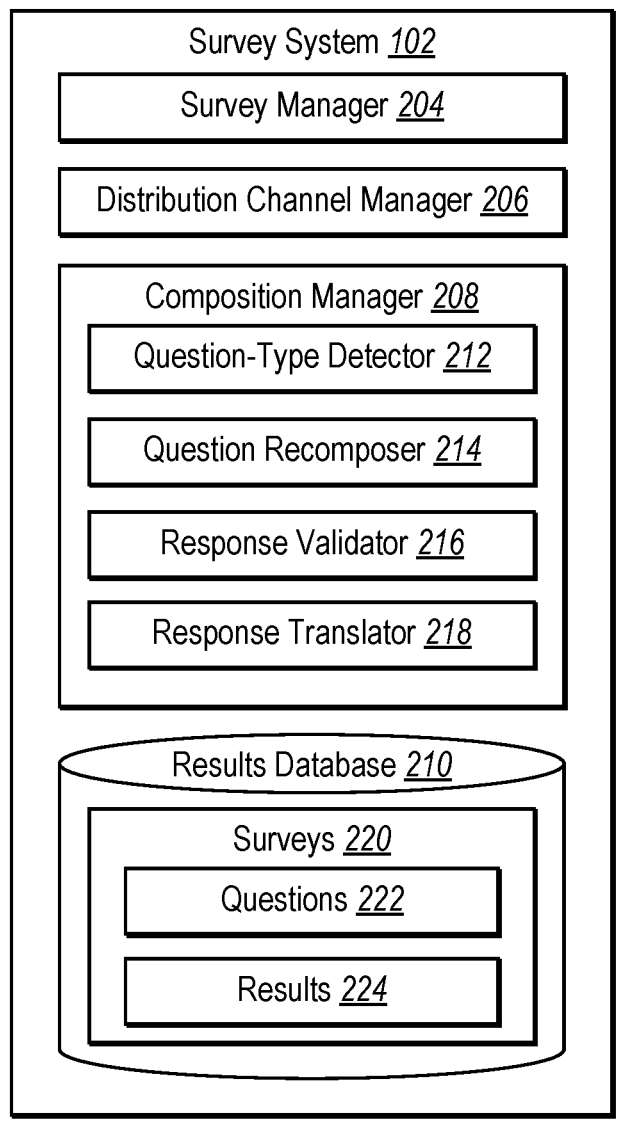
FIG. 2 illustrates an example schematic diagram of a survey system in accordance with one or more embodiments.

FIG. 2 illustrates a schematic diagram of a survey system 102 in accordance with one or more embodiments. The survey system 102 may be an example embodiment of the survey system 102 described in connection with the survey system 102 of FIG. 1. The survey system 102 can include various components for performing the processes and features described herein. For example, in the illustrated embodiment, the survey system 102 includes a survey manager 204, a distribution channel manager 206, a composition manager 208, and a results database 210. In addition, the survey system 102 may include additional components not illustrated, such as those as described below. The various components of the survey system 102 may be in communication with each other using any suitable communication protocols, such as described with respect to FIG. 12 below.

Each component of the survey system 102 may be implemented using one or more computing devices (e.g., server devices) including at least one processor executing instructions that cause the survey system 102 to perform the processes described herein. The components of the survey system 102 can be implemented by a single server device or across multiple server devices, as described above. Although a particular number of components are shown in FIG. 1, the survey system 102 can include more components or can combine the components into fewer components (such as a single component), as may be desirable for a particular implementation.

As illustrated, the survey system 102 includes a survey manager 204. The survey manager 204 can manage the creation of a survey and the composition of one or more survey questions. Additionally, the survey manager 204 can manage the collection of responses provided by respondents in response one or more survey questions provided by the survey system 102. In particular, the survey manager 204 can assist a user in generating and/or creating surveys, which enable the user to obtain feedback from respondents. For example, the user may interact with the survey manager 204 to create and/or organize a survey that includes one or more survey questions.

As part of assisting a user in creating a survey, the survey manager 204 may suggest additional survey questions to include in the survey. For example, if a user selects a question that prompts a respondent to select an answer from a range of available answer choices, the survey manager 204 may recommend that the user also add an open ended questions to ask the respondent depending in the respondent's answer to the question.

To illustrate, a survey administrator or product manager (e.g., the user) may add a question to a survey that asks a respondent to rank a satisfaction level with a product from one (1) to ten (10), where one (1) is very unsatisfied and ten (10) is very satisfied. If a respondent marks a low score (e.g., a 1, 2, or 3), the survey manager 204 may suggest adding an open-ended question that asks the respondent to explain his or her dissatisfaction with the product and/or what could be done to improve the respondent's satisfaction level. If the respondent marks a high score (e.g., an 8, 9, or 10), the survey manager 204 may suggest adding an open-ended question that asks the respondent the reason behind the respondent's satisfied with the product and/or what the respondent likes about the product.

The survey manager 204 may provide other features to assist a user in the creation and composition of survey questions to present to respondents. For instance, the survey manager 204 may provide alternative wording for questions provided by the user. Further, the survey manager 204 may allow the user to review the set of survey questions as if a respondent was viewing the survey, such as in a preview mode.

In addition to creating a survey, the survey manager 204 may assist a user in editing a survey that the user is creating or has created. For example, the survey manager 204 may provide tools that allow a user to add, remove, edit, or otherwise modify survey questions. For instance, the survey manager 204 may enable a user to change the available answer choices for a survey question. In another instance, the survey manager 204 may allow the user to remove one or more survey questions, even after the survey has begun to be administered to respondents.

Further, the survey manager 204 may allow a user to specify preferences and/or parameters for one or more surveys. For example, the user may use the survey manager 204 to specify the beginning date of a survey, a survey's duration, and/or when a survey expires. The survey manager 204 may also enable a user to specify how long a respondent has to complete a survey, or the time (e.g., either a minimum time or a maximum time) a respondent has to respond to a survey question, In some example embodiments, the survey manager 204 may assist a user in specifying customizations to apply to a survey. For instance, a user may use the survey manager 204 to apply specific branding to a survey, such as applying a particular color scheme and/or adding a company's logo. Further, the user may use the survey manager 204 to specify when questions on a survey should import piped text (e.g., respondent-customized text) into a survey based on contact and demographic information the survey system has on file for respondents. For example, when a user selects an option to add piped text, the survey manager 204 may input the name, age, and/or gender of a respondent in survey questions sent to the specific respondent.

In a similar manner, the survey manager 204 may aid a user in selecting the respondents to whom to send a survey. In some cases, the survey manager 204 may provide a listing of respondents to whom to send a survey. In additional, the survey manager 204 may organize respondents in groups and allow a user to select one or more groups. In some instances, the survey manager 204 may allow the user to import contact information for respondents. For instance, the user may upload a list of mobile numbers to which the survey system 102 should send a survey.

In addition to creating a survey, the survey manager 204 may enable the user to select which distribution channel(s) the survey system 102 should use when administering the survey. As one example, the user may select an option to have the survey system 102 administer the survey system on a website available via the Internet. Additionally or alternatively, the user may select an option for the survey system 102 to administer the survey via instant messages, text messages, or within a chat session. When selecting multiple distribution channels on which to administer a survey, the survey manager 204 may prioritize one distribution channel over another distribution channel. For instance, the survey manager 204 may instruct the survey system 102 to attempt to administer a survey via the Internet (i.e., using hyperlinks and websites), and if unsuccessful, to administer the survey via text message.

In some example embodiments, the survey manager 204 may be located outside of the survey system 102. In other words, the survey manager 204 may be part of a system that is separate from the survey system 102, such as belonging to a third-party system. When the survey manager is located outside the survey system 102, the survey manager 204 may, apart form the survey system 102, create and distribute surveys as well as gather and store responses from respondents for the surveys.

Regardless of whether the survey manager 204 operates as part of the survey system 102 or another system, the survey manager 204 can collect responses to survey questions provided by respondents. The survey manager 204 may collect responses in a variety of ways. To illustrate, the survey manager 204 may extract responses to a survey question in bulk. For example, the survey manager 204 may collect a list of multiple responses to a survey question. In addition, or in the alternative, the survey manager 204 may collect responses to a survey question as respondents provided their responses to the survey question.

Once the survey manager 204 collects a response to a survey question, the survey manager 204 can verify the answer to the survey question provided in the response. In particular, if the respondent is responding to a survey question that includes available answer choices, the survey manager 204 can determine that the response includes an answer that corresponds to one of the available answer choices for the survey question. In this manner, the survey manager 204 may ensure that only valid answers are being included in the results and stored in the survey system 102, as described below. If the survey manager 204 determines that an answer is invalid, the survey manager 204 may enable the respondent to re-answer the survey question. In some cases, if the respondent is unavailable, the survey manager 204 may disregard the invalid answer in the response.

In some example embodiments, upon collecting and verifying responses, the survey manager 204 may store the responses. More specifically, the survey manager 204 can store the responses for a survey in a results database 210. In some instances, the survey manager 204 may separately store responses for each survey question. To illustrate, if a survey includes two survey questions, then the survey manager 204 can store responses for the first survey question together and responses for the second survey question together. Additionally or alternatively, the survey manager 204 may store the responses outside of the survey system or on a system belonging to a third-party.

Further, after verifying that an answer for a survey question is valid, the survey manager 204 may compile answers for survey questions into a set of results. In some cases, compiling the results may include adding a newly obtained answer to a set of previously compiled results. For example, each time a respondent answers a particular survey question for a survey, the survey manager 204 may add the newly received answer to answers previously received from other respondents for the same survey question. Additionally, the survey manager 204 may compile a set of survey results based on the results for each survey question.

The survey manager 204 may also provide the results for one or more survey questions in a survey to the user that created the survey, a survey administrator, and/or a survey result reviewer. The survey manager 204 may present the results using charts, graphs, and/or other graphics. For example, for a multiple choice question, the survey manager 204 may provide a bar graph comparing each answer together. Further, the survey manager 204 may update the results as additional answers are received from respondents, as described above.

In some example embodiments, the survey manager 204 may present the results to the user via a website. The website may be the same website used by the user to create the survey. The website may provide results of the survey to the user regardless of the distribution channel the survey system 102 employed to administer the survey. For example, the website may display a single set of results of a survey even when respondents of the survey completed the survey via multiple distribution channels, such as online or via text messages, chat, instant messaging, email, etc.

As briefly mentioned above, the survey system 102 includes a distribution channel manager 206. When the survey system 102 administers a survey, the distribution channel manager 206 may send and receive the survey to and from designated respondents. More specifically, the distribution channel manager 206 may send and receive surveys to respondents via the distribution channel(s) selected by the user.

In particular, when a user selects a particular distribution channel on which to administer a survey, the distribution channel manager 206 may identify the protocols and communication requirements for the particular distribution channel. For example, when the user selects the option to administer a survey via a website, the distribution channel manager 206 may identify relevant protocols, such as TCP/IP, HTTP, etc., along with the requirements for each protocol. As another example, when the user selects the option to administer a survey to mobile devices via text message, the distribution channel manager 206 may identify the protocols for sending and receiving messages via SMS, short message peer-to-peer (SMPP), multimedia messaging service (MMS), enhanced messaging service (EMS), and/or simple mail transport protocol (SMTP).

Additionally, the distribution channel manager 206 may specify outgoing address information associated with a survey. Depending on the distribution channel, the distribution channel manager 206 may send a survey from one of multiple addresses (e.g., websites, email addresses, phone numbers, etc.). In the case of multiple distribution channels, the distribution channel manager 206 may specify the outgoing address from which to send a particular survey. In this manner, when a respondent receives a survey, or a request to participate in a survey, the incoming address seen by the respondent is the outgoing address specified by the distribution channel manager 206.

To illustrate, a user can select the option or designate a survey to be sent via text message to a respondent's mobile device. When sending a text message to a respondent's mobile device, the distribution channel manager 206 may choose from a number of outgoing addresses from which to send the survey. In some example embodiments, the distribution channel manager 206 may select between short numbers (e.g., 5-digit or short code numbers) and/or long numbers (e.g., 10-digit or long code numbers). Further, in one or more embodiments, the distribution channel manager 206 may allow a user to specify which outgoing address(es) the distribution channel manager 206 should associate with a survey and/or distribution channel.

In one or more embodiments, the survey system 102 may be administering multiple surveys to the same respondent. In some of these embodiments, because the distribution channel manager 206 is able to send a survey to a respondent via multiple outgoing addresses, the distribution channel manager 206 may associate a different outgoing address with each survey being sent to the respondent. To illustrate, a first survey may be sent to the mobile device of a respondent via a first outgoing address, and a second survey may be sent to the mobile device of the respondent via a second outgoing address.

In some example embodiments, the distribution channel manager 206 may use one or more third-party services to distribute a survey to respondents. For instance, when a user selects the option to administer a survey via a particular distribution channel, the distribution channel manager 206 may use a third-party service that is specialized in distributing information via the particular distribution channel. For example, if a user specifies that a survey should be administered via text message, the survey system 102 may employ a third-party text messaging service to send and receive the survey.

The distribution channel manager 206 may provide navigational tools and options to the respondent based on the distribution channel that the distribution channel manager 206 uses to send a survey to a respondent. For example, when administering a survey via a website, the distribution channel manager 206 may provide navigational tools, such as a progress indicator, and navigational options, such forward and back, to the respondent. As another example, when administering a survey via text message, the distribution channel manager 206 may provide navigational tools and options that allow a respondent to skip a question, return to a previous question, stop the survey, get progress update, etc. Due to the nature of text messages, however, the distribution channel manager 206 may provide these tools and options to a respondent upon a respondent sending particular key words in a response, such as "skip," "back," "stop," "status," etc.

In one or more embodiments, the distribution channel manager 206 may provide an option for a respondent to pause a survey and resume the survey using a different distribution channel. For example, when a respondent is completing a survey via a text message on a mobile device, the respondent may respond with "web access," "online version," or some other type of response indicating a desire to continue the survey online. In response, the distribution channel manager 206 may provide the respondent with a link (e.g., URL), which when selected, allows the respondent to continue the survey online rather than by text message. In some embodiments, the user designs the survey to automatically include the link in the survey (e.g., at the beginning of the survey), such that the respondent can use the link at anytime to continue the survey via a different distribution channel. Likewise, a respondent completing the survey online may select an option, such as a link built into or presented by the survey, to continue the survey via an alternative distribution channel, such as email, text message, instant message, etc.

Further, when available, the distribution channel manager 206 may provide an option for a respondent to select a language preference. The preference may be applied on a per survey basis or applied to future surveys for the respondent (e.g., such as a global preference). Depending on the distribution channel on which the survey is administered, the option to set a language preference may be displayed as an option within the survey. Alternatively, the user may need to specify their language preference in response to a language preference message sent by the survey system 102 (e.g., text "Spanish" back to complete the survey in Spanish).

In some example embodiments, depending on the distribution channel used, the distribution channel manager 206 may receive multiple responses corresponding to a single communication. For example, when sending and receiving a survey via some text message distribution channels, such as SMS, the distribution channel may limit the number of characters that can be included in an electronic communication (e.g., up to 160 characters). As such, the distribution channel may break up text messages in multiple messages. If the distribution channel manager 206 receives multiple text messages within a predefined time of one another (e.g., 10 seconds), the distribution channel manager 206 may need to concatenate the multiple text messages into a single response.

When concatenating responses, the distribution channel manager 206 may determine the number of text messages that correspond to a response. If the distribution channel manager 206 determines that two text messages correspond to a response, the distribution channel manager 206 may identify the text message with 160 characters (or other character limit) as the first part of the response and the text message with less than 160 characters as the second part of the response. If the distribution channel manager 206 determines that more than two text messages correspond to a response, the distribution channel manager 206 may identify the text message with less than 160 characters is the last part of the response. Further, the distribution channel manager 206 may use capitalizations at the beginning of the response, timestamps, and other factors to determine the order of the remaining text messages. In some cases, the text messages themselves will provide an indication of the order that the text messages should be concatenated (e.g., "Message 1 of 3," "Message 2 of 3," and "Message 3 of 3"), which the distribution channel manager 206 can use to concatenating the multiple related text messages.

While the distribution channel manager 206 may send a survey to a respondent upon the request of a user, as described above, in some cases, a respondent may initiate the survey. For example, a respondent may contact the survey system 102 to take a survey. Depending on the distribution channel the respondent uses to take the survey, the respondent may need to include an access code when contacting the survey system 102 to initiate a survey. For instance, when sending a text message to the survey system 102 (e.g., to an address associated with the survey system 102), the access code included in the text message indicates to the survey system 102 the particular survey that the respondent desires to take. Accordingly, the distribution channel manager 206 may detect the incoming text message, identify the access code in the text message, and indicate to the survey system 102 that the respondent would like to take the corresponding survey.

As described above, a user may specify that the survey system 102 administer a survey via a particular distribution channel. In some example embodiments, the user may specify that the survey manager 204 administer a survey via text message, such as via an instant message, a SMS, a chat, or another text-based distribution channel. The survey manager 204, however, may be unable to administer a survey over the specified distribution channel because one or more survey question in the survey were not composed to be administered over the specified distribution channel.

To illustrate, the user may create a survey online. The user may create the survey online using applications and tools provided by the survey manager 204, as described above. As part of creating the survey, the user may select the option to distribute the survey via text message (in addition or in place of administering the survey online). If the user created the survey to be distributed as an online survey, rather than requiring that the user manually recreate the survey for distribution via text message, the survey system 102 may automatically recompose the survey to be distributed via text message.

To illustrate, the survey system includes the composition manager 208, which includes a question-type detector 212, a question recomposer 214, a response validator 216, and a response translator 218. When the survey system 102 needs to distribute a survey on a distribution channel other than the distribution channel for which the survey was created, the composition manager 208 may, without user intervention, recompose the survey to enable the survey to be presented on the selected distribution channel.

To illustrate, when recomposing a survey, the composition manager 208 may determine whether a survey question in the survey can be sent via the selected distribution channel or if the survey question needs to be recomposed before the survey question can be sent via the selected distribution channel. In some example embodiments, the composition manager 208 may determine whether a survey question needs to be recomposed based on question type. Accordingly, the composition manager 208 may include a question-type detector 212 that identifies and detects the question-type of survey questions, and determines if the composition manager 208 needs to recompose one or more survey question. A survey question can be one of many question types. Examples of question types include, but are not limited to net promoter score (NPS), multiple choice, multiple selection, open-ended, ranking, scoring, summation, demographic, dichotomous, differential, cumulative, drop-down, matrix, short response, essay response, heat map, etc.

The question-type detector 212 may determine the question type of a survey question using a variety of methods. In one or more embodiments, the question-type detector 212 may identify that a survey question has been tagged as a specific question type. For example, as part of creating a survey, a user may select a particular type of question to add to the survey. For instance, the user may select a multiple choice or open-ended survey question to add to the survey. When the user selects to add a survey question having a particular question type, the survey system 102 may tag the survey question as having the selected question type.

Additionally or alternatively, the question-type detector 212 may analyze the survey question to determine the question type. For instance, the question-type detector 212 may identify key words in a question that may indicate the question type. For example, upon detecting that the survey question includes the words "additional comments," the question-type detector 212 may determine that the survey question is an open-ended question. As another example, upon identifying the words, "mark all that apply," the question-type detector 212 may identify the question type as a multiple selection question.

Further, the question-type detector 212 may use the presence of available answer choices in a survey question to determine the question type of the survey question. For instance, if no available answer choices are associated with an answer, the question-type detector 212 may rule out the possibility of the survey question being a multiple choice or multiple selection question. Further, the question-type detector 212 may determine that the question type is open-ended, short response, or essay response. In another instance, if the question-type detector 212 determines that a respondent must select one of two answers, or if the only available answer choices are "yes" and "no," the question-type detector 212 may determine the question type to be dichotomous. Similarly, if the question-type detector 212 determines that a respondent must select one of multiple available answer choices, the question-type detector 212 may determine that the survey question is a multiple choice question.

Depending on the selected distribution channel and the question type, the composition manager 212 may determine to recompose a question to be better suited for the selected distribution channel. For example, if a survey is to be administered via text message, the composition manager 208 may determine that recomposing open-ended questions would minimally benefit respondents, while recomposing survey questions with multiple available answer choices (e.g., multiple selection, and matrix survey questions) would benefit respondents by allowing respondents to conveniently answer these questions via text message.

When the composition manager 208 determines that a survey question should be recomposed, the question recomposer 214 may recompose the survey question to better suit the selected distribution channel. For example, the question recomposer 214 may recompose (e.g., reformat, restructure, or otherwise modify) a survey question before the survey question is provided to a respondent over the selected distribution channel. Features and functionalities of the question recomposer 214 will now be described. In addition, FIGS. 5A-8B provide various examples and embodiments of recomposing survey questions composed originally for use with one distribution channel, and then recomposed to be provided via another distribution channel.

For purposes of explanation, the question recomposer 214 will be described in terms of recomposing a survey question originally composed for an online survey to a recomposed survey question to be presented via text message. One will appreciate, however, that the principles described herein with respect to the question recomposer 214 apply to recomposing a survey question to be provided via other distribution channels. Further, when a user composes a survey question, the user may intend for the survey question to be distributed via text message, however, it may be more intuitive and familiar for the user, given the tools provided by the survey system 102, to create a survey questions for online distribution rather than for distribution via text message.

In general, the question recomposer 214 recomposes survey questions such that the survey question can be more easily answered via the selected distribution channel. For example, when a respondent is answering a multiple choice or multiple selection answer on a webpage, the respondent may use a cursor to select an answer from the available answer choices. If the same question was presented to the responded via text message, however, the responder does not have the option to use a cursor to select an answer. Accordingly, the question recomposer 214 may recompose the question to allow the respondent to answer the survey question with minimal effort, such as answering a multiple choice survey question by texting back a single digit or single letter.

In some example embodiments, the question recomposer 214 may recompose a survey question based on protocol limitations of the distribution channel over which the survey question is sent. For example, if the survey is administered via text message such as SMS, each text message sent may be limited to 160 characters. Other distribution channel protocols may have similar character limitations. Accordingly, the question recomposer 214 may recompose a survey question by reducing words and/or characters in a survey question to fit within a single message. Fitting a survey question in a single message may allow a respondent to see the entire survey question as a whole, rather than the survey question being divided into multiple parts.

Alternatively, the question recomposer 214 may determine to send a survey question as multiple messages. In this case, the question recomposer 214 may determine where to split a survey question in order to reduce confusion to a respondent. For example, the question recomposer 214 may prevent splitting the survey question between text (e.g., moving available answer choices to another text message). Further, the question recomposer 214 may ensure that when multiple messages are sent for a survey question, the messages do not arrive out of order, as often is the case when a text message system splits a single text message into multiple text messages.

In some example embodiments, and based on question type, the question recomposer 214 may divide a survey question into multiple recomposed survey questions when presenting the survey question via text message. For example, and as shown and explained below in FIGS. 6A-6B, a survey may include a matrix survey question. Presenting a matrix question composed for an online survey via text message is not practical and in some cases, not possible for a respondent to answer. Accordingly, the question recomposer 214 may recompose a matrix question to be presented via text message by dividing the matrix question into multiple recomposed questions.

In one or more embodiments, the question recomposer 214 may recompose a survey question by assigning or mapping available answer choices of the survey question to corresponding letters or numbers. To illustrate, a survey question may ask "How often do you visit our restaurant?" and provide available answer choices of "Daily," "Weekly," "Monthly," "Yearly," and "Never." The question recomposer 214 may recompose the available answer choices into "1—Daily," "2—Weekly," "3—Monthly," "4—Yearly," and "5—Never," where a respondent need only to respond with the corresponding number (e.g., "1," "2," "3," "4," or "5"). In some cases, the question recomposer 214 can associate numbers to available answer choices that are words (e.g., "1: Dog," "2: Cat," "3: Bird," etc.) while associating letters with available answer choices that include numbers (e.g., "A: 0," "B: 1-10," "C: 11-50," etc.).

Further, when the question recomposer 214 recomposes available answer choices of a survey question by assigning letters or numbers to each available answer choice, the question recomposer 214 may accept multiple answers for each available answer choice. For example, if a recomposed survey question that includes the recomposed answers of "1: Dog," "2: Cat," "3: Bird," a response including either "2" or "Cat" may be valid because the survey system 102 may use either value to determine the respondent's answer to the survey question.

As mentioned above, the question recomposer 214 may recompose a survey question based on the question type of the survey question. For example, the question recomposer 214 may recompose a multiple choice or multiple selection survey question. Before recomposing a multiple choice question however, the question recomposer 214 may determine if available answer choices associated with the multiple choice question are already suitable for distribution via text message. For instance, a multiple choice question may include numerical answers such as "1," "2," "3," and "4" or "1," "10," "100," and "1000." In this case, the question recomposer 214 may determine that the available answer choices in the multiple choice question do not need to be recomposed before being presented via text message.

In addition to recomposing survey questions of a survey, the question recomposer 214 may allow a user creating a survey to view recomposed survey questions as the user is composing a survey question. For example, if the user is adding a survey question via an online interface, the survey system 102 may display the survey question as composed by the user. In addition, the survey system 102 may display the recomposed survey question as it would appear on a mobile device or within a text message. Additionally or alternatively, the question recomposer 214 may provide the recomposed survey question in a text message to the user and allow the user to respond to the recomposed survey question. The question recomposer 214 may provide the recomposed survey question to the user as part of a test mode where answers by the user are not included in the results of the survey.

Along similar lines, when the question recomposer 214 provides a preview of a recomposed survey question to the user creating a survey, the question recomposer 214 may determine whether a recomposed question is compatible with the select distribution channel. For example, the question recomposer 214 may determine that a recomposed question will not display via text message (or via another distribution channel) or that the recomposed survey question will be displayed in a manner that may be confusing or unpleasant when presented via text message. Upon making the determination, the question recomposer 214 may notify or warn the user that a survey question is not able to be recomposed for a selected distribution channel (e.g., specifically notify the user that the survey question is too long, or the survey question type does not lend itself to the new format of the selected distribution channel). In such a case, the survey system 102 may allow the user to manually recompose the survey question. For instance, the question recomposer 214 may provide the user with suggestions or alternative approaches to rephrase or reformat the survey questions, as described below. Additionally, or alternatively, the question recomposer 214 may automatically recompose the survey question specifically for the selected distribution channel, delete the survey question, or skip the survey question when administering the survey via the selected distribution channel.

Similarly, if the question recomposer 214 is recomposing a survey question after a user has created a survey, the question recomposer 214 may skip a survey question that is not presentable via the selected distribution channel. For example, the question recomposer 214 may determine that a recomposed survey question is not presentable via text message. As such the question recomposer 214 may notify the survey system 102 and the survey system 102 may skip to the next presentable survey question via text message. Further, the question recomposer 214 may notify the creator of the survey or a survey administrator of the incompatibility.

In some example embodiments, after the question recomposer 214 has recomposed a survey question to be sent via a select distribution channel, the distribution channel manager 206 (described above) can send and receive the recomposed survey question. Depending on the properties of the selected distribution channel, the distribution channel manager 206 may send and receive individual recomposed survey questions, in a serial manner, as described below. Alternatively, in some embodiments, the distribution channel manager 206 may send and receive multiple survey questions at one time.

In one or more embodiments, the distribution channel manager 206 may not receive a response to a survey question sent, such as with a survey question or recomposed survey question sent via text message or instant message. After a threshold period of time has passed without receiving a response (e.g., an hour, a day, two days, a week, etc.), the distribution channel manager 206 may send another message asking the respondent if the respondent desires to continue the survey, or if the respondent prefers to stop the survey. If the respondent desires to continue the survey, the distribution channel manager 206 may resend the last survey question response. Alternatively, if the respondent does not respond or responds to stop the survey, the distribution channel manager 206 may send a confirmation that the survey is terminated for the respondent.

Once the distribution channel manager 206 receives a response, to a recomposed survey question, the composition manager 208 may validate the response. In particular, the response validator 216 may validate the response received from a respondent within a text message. As described below in additional detail, the response validator 216 may determine whether a text message response to a survey question or a recomposed survey question is valid. Additional detail of verifying responses is provided with respect to FIG. 4.

The response validator 216 may validate a response based on a number of factors. As one example, the response validator 216 may determine if a response is empty, blank, or contains bad data. If the response validator 216 determines that a response does not include a plausible answer (e.g., the response is empty, blank, or nonsensical), the response validator 216 may identify the response as invalid.

When the response validator 216 determines that a response is invalid, the response validator 216 may send a notification to the respondent indicating the invalid response. The response validator 216 may also include options in the notification that enables the respondent to re-respond to the survey question, skip the survey question, stop the survey, etc. Additionally or alternatively, the response validator 216 may cause the survey system 102 to resend the survey question, or recomposed survey question, to the respondent and allow the respondent to provide a valid response.

Figure 4:
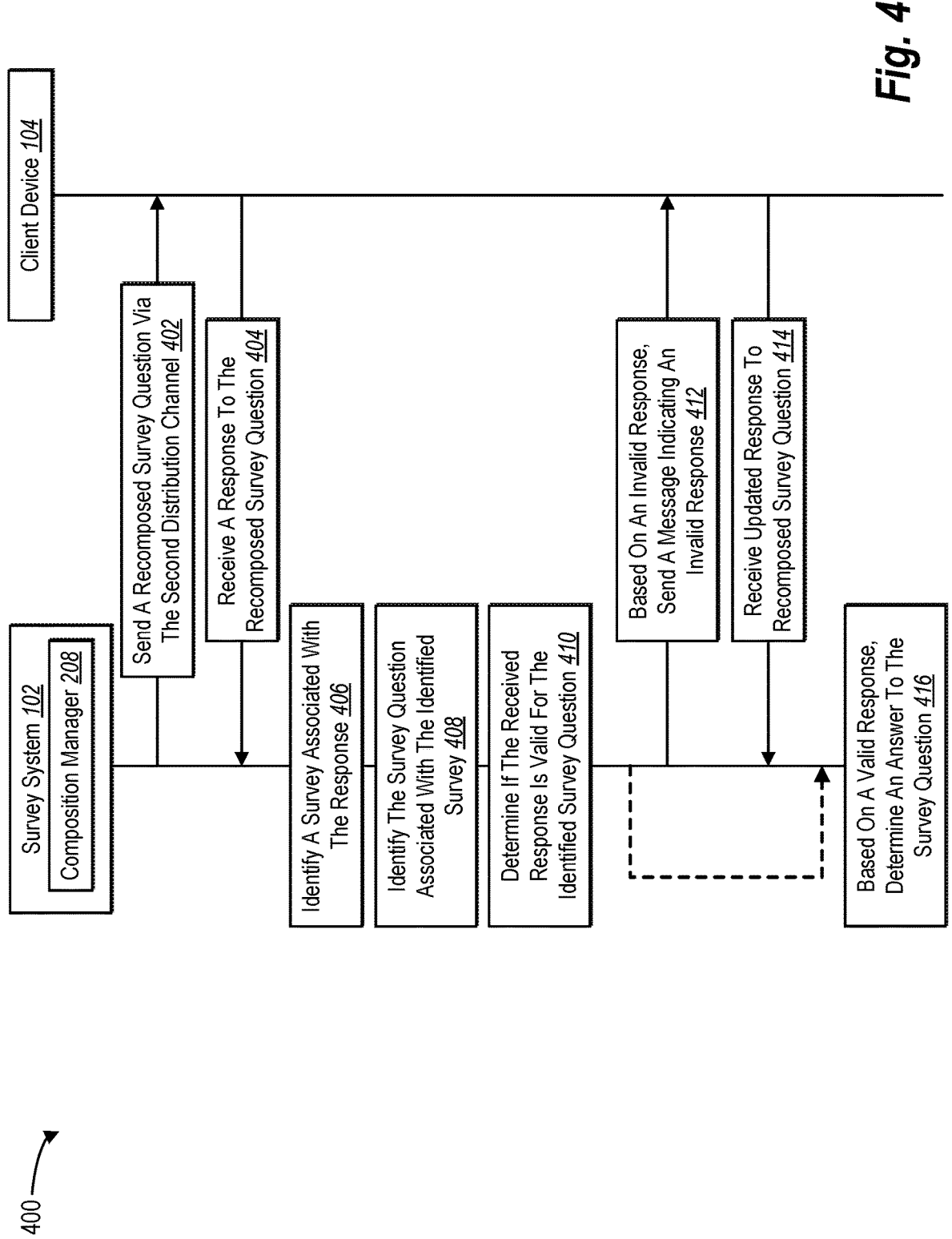
FIG. 4 illustrates a sequence-flow method showing the survey system validating responses to a survey question received from a client device in accordance with one or more embodiments.
Figure 5:
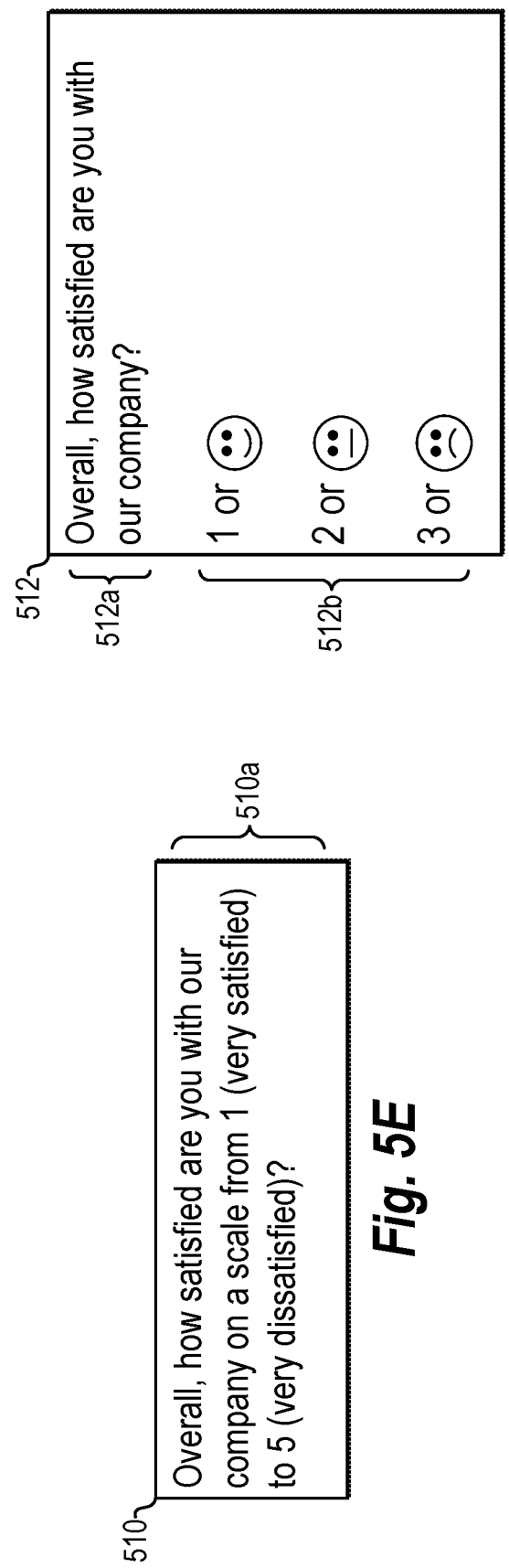
FIG. 5A illustrates an example of a multiple choice survey question composed for presentation on a first distribution channel in accordance with one or more embodiments.
FIGS. 5B-5F illustrate examples of recomposed multiple choice survey questions for presentation on a second distribution channel in accordance with one or more embodiments.
Figure 6:
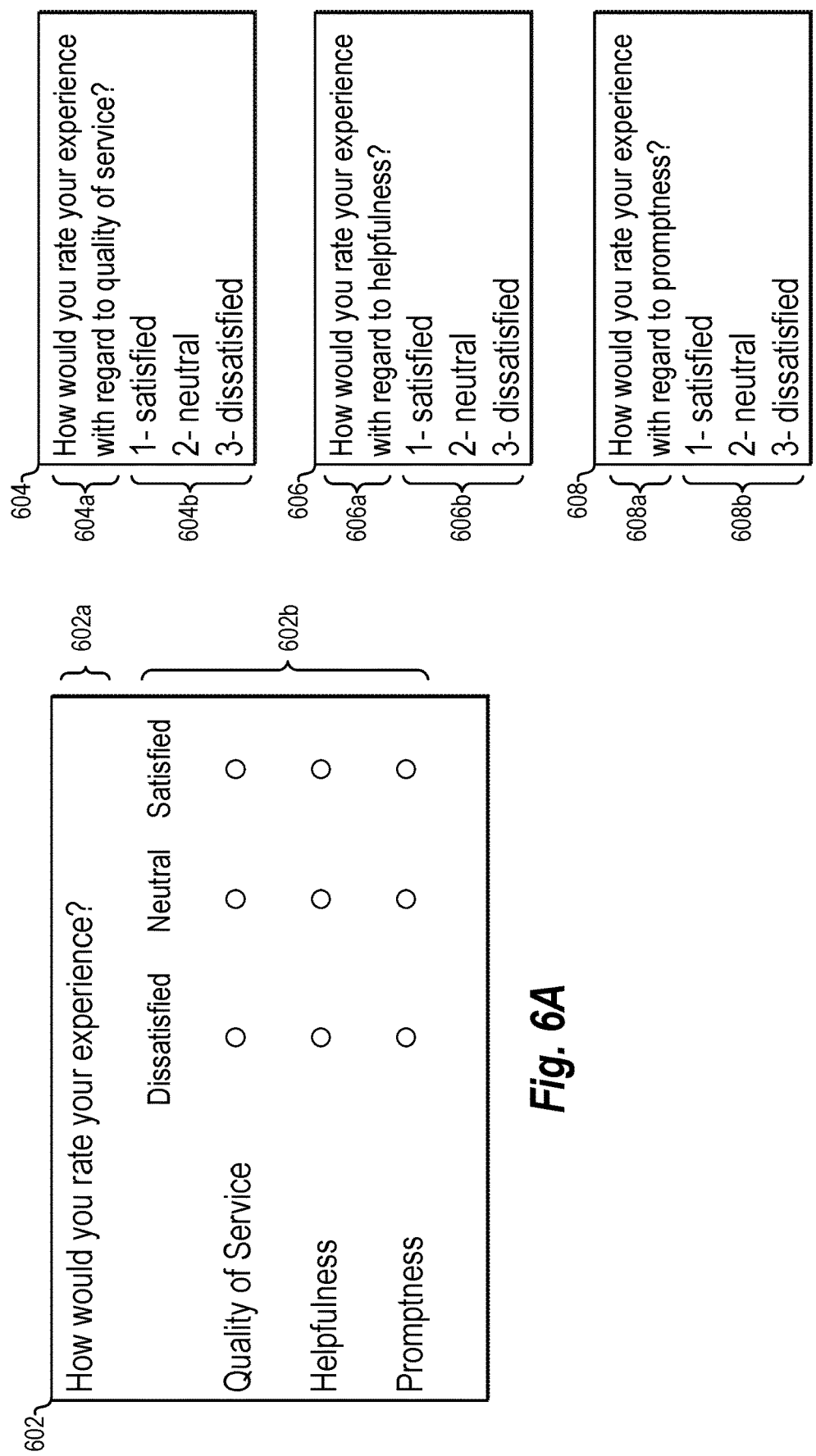
FIG. 6A illustrates an example of a matrix survey question composed for presentation on a first distribution channel in accordance with one or more embodiments.
FIG. 6B illustrates an example of recomposed matrix survey questions for presentation on a second distribution channel in accordance with one or more embodiments.
Figure 7:
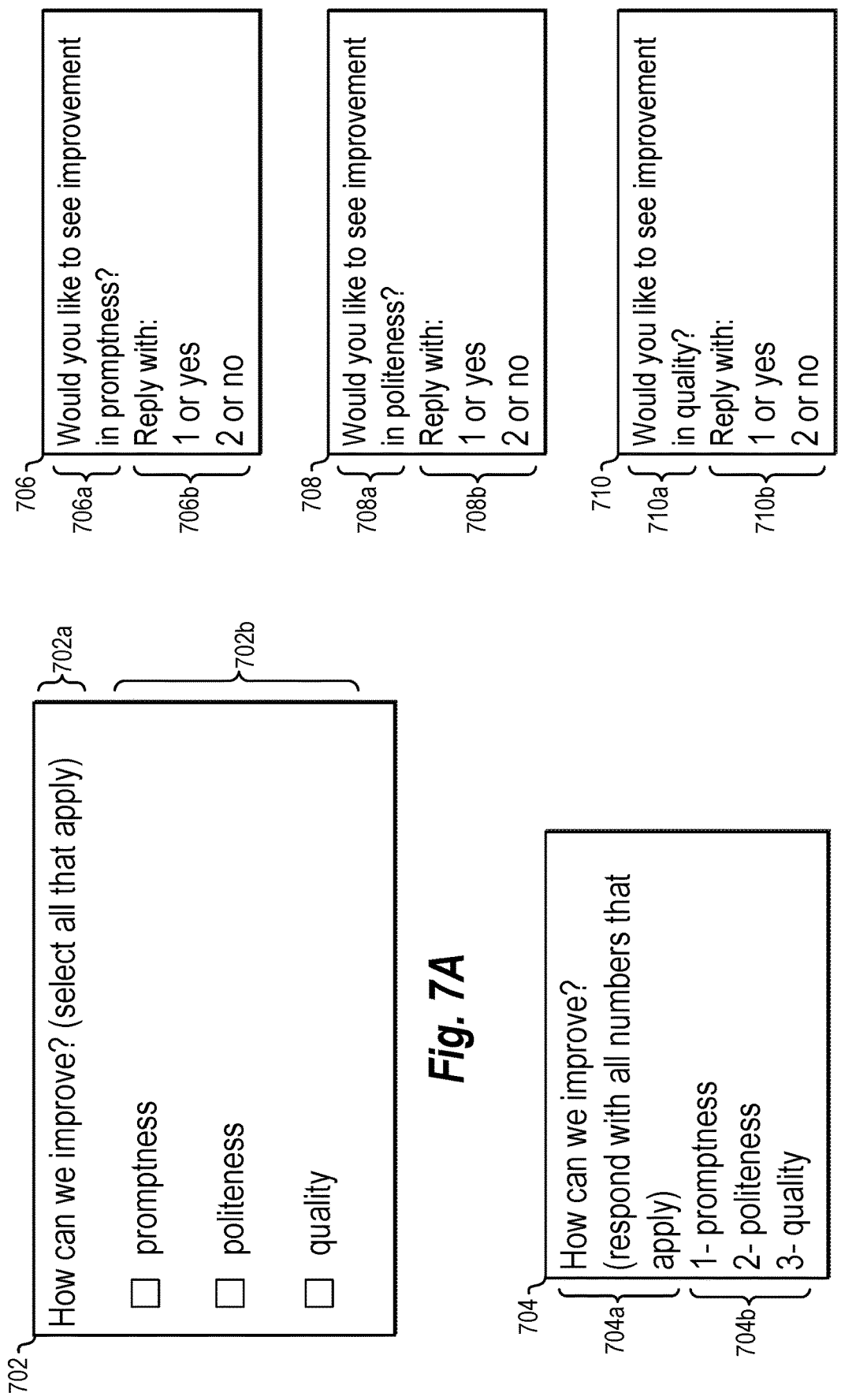
FIG. 7A illustrates an example of a multiple selection survey question composed for presentation on a first distribution channel in accordance with one or more embodiments.
FIGS. 7B-7C illustrate examples of recomposed multiple selection survey questions for presentation on a second distribution channel in accordance with one or more embodiments.
Figure 8:
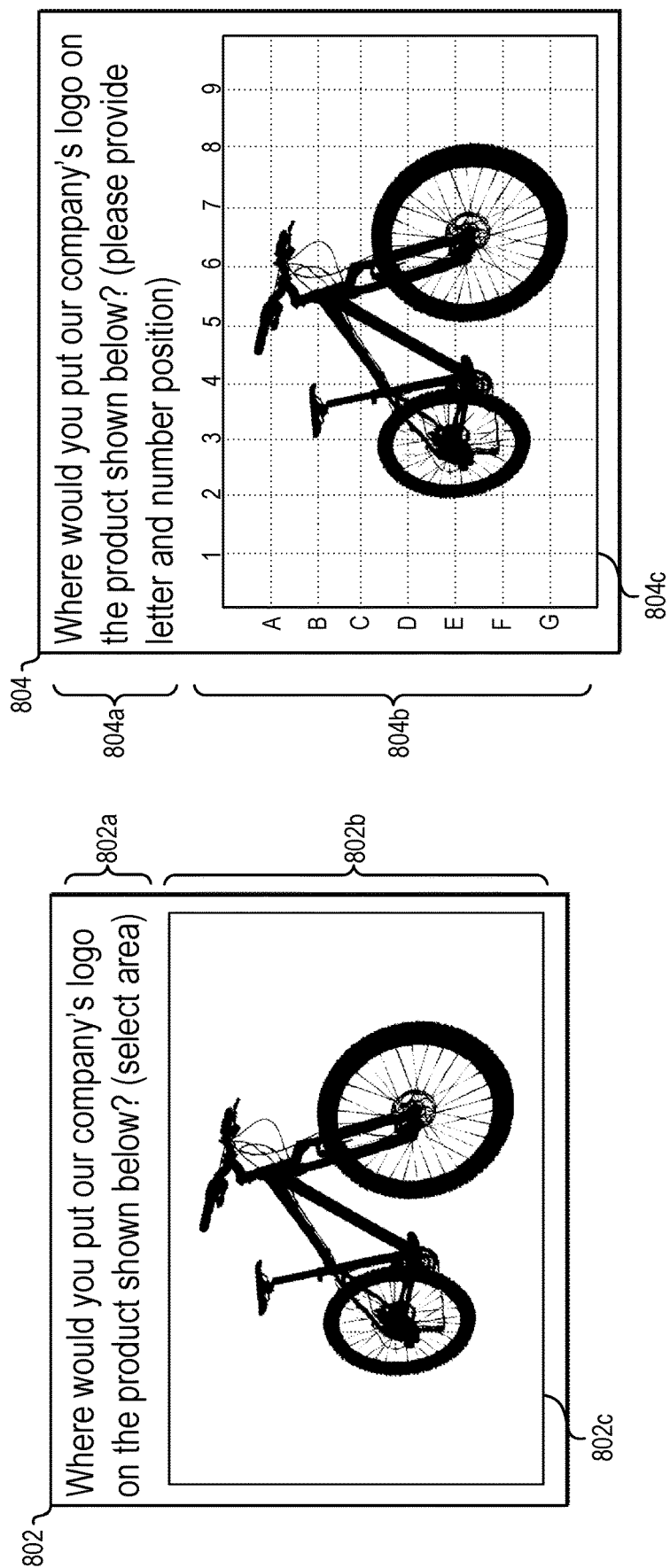
FIG. 8A illustrates an example of a heat map survey question composed for presentation on a first distribution channel in accordance with one or more embodiments.
FIG. 8B illustrates an example of a recomposed heat map survey question for presentation on a second distribution channel in accordance with one or more embodiments.

If the response validator 216 determines that a response includes a valid response, the response validator 216 may further validate the response. For example, the response validator 216 can verify that the response corresponds to an active or open survey. For instance, the response validator 216 may use information from the response to identify the survey to which that the response corresponds. FIG. 4, described below, provides additional detail regarding the survey system 102 identifying the survey to which the response corresponds.

In some cases, the response validator 216 may determine the survey that the respondent is attempting to respond to has timed-out or expired. In other cases, the response validator 216 may determine that the response does not correspond to an active survey. For instance, the response validator 216 may receive a text message from a respondent that does not correspond to a survey being administered by the survey system 102. In this case, the survey system 102 may indicate, for example, via a message, to the respondent that the response is invalid. Further, the survey system 102 may provide information, such as an activation code, to the respondent to allow the respondent to start a new survey session.

Further, when the survey system 102 receives a response to a recomposed survey question, the response validator 216 may determine whether the response answers a recomposed survey question by including a selection of one of the available recomposed answer choices. For example, the response validator 216 may compare the response to the available recomposed answer choices to identify a match. If the response matches one of the available recomposed answer choices, the response validator 216 can determine that the response is a valid response.

In addition, the response validator 216 may determine if the response includes only one answer, or if the response includes multiple answers. The response validator 216 may match the response to the recomposed survey question to determine if the recomposed survey question allows for the selection of multiple answers, and if so, whether the multiple answers are plausible answers. For example, if the recomposed survey is a multiple selection question, then a response can validly include multiple answers. In another instance, the response validator 216 may detect that the response includes multiple answers, but that the multiple answers correspond to each other. To illustrate, a valid response to a recomposed survey question may be "1" where "1" refers to an answer to the recomposed question (mapped to the available answer choice of "Cat" in the survey question). In addition, the answer of "Cat" may also be a valid answer choice of the same survey question.

As shown in FIG. 2, the survey system 102 may include a results database 210. The results database 210 may be made up of a single database or multiple databases. In addition, the results database 210 may be located within the survey system 102. Alternatively, the results database 210 may be external to the survey system 102, such as in cloud storage. Further, the results database 210 may store and provide data and information to the survey system 102, as further described below.

The results database 210 may include surveys 220, such as surveys created via the survey manager 204. Further, the results database 210 may also include surveys imported from third-party sources. In addition, the results database 210 may store information about each survey, such as parameters and preferences that correspond to each survey. For example, when a user creates a survey and specifies that the survey be administered via a selected distribution channel, the results database 210 may record the user's specified selection.

Each survey may have a survey identifier (or simply "survey ID") to provide unique identification. In some cases, the surveys may be organized according to survey ID. Alternatively, surveys 220 in the results database 210 may be organized according to other criteria, such as creation date, last modified date, closing time, most recent results, etc. Further, the results database 210 may associate access codes with a survey ID, such that the survey system 102 can identify to which survey a response corresponds when the response includes an access code.

As described below, in one or more embodiments, the survey system 102 may associate a survey ID with a survey token. A survey token may identify when a particular respondent is completing a particular survey. In some cases, survey tokens may also correspond to the distribution channel a respondent is using to respond to a survey. For example, when a respondent is completing a survey via text message, the survey system 102 may create and store a token that includes the originating address (e.g., the outgoing number the survey system 102 is using to send the survey) and the destination address (e.g., the respondent's number to which the survey system 102 is sending the survey). In this manner, when a respondent is completing a survey, the survey system 102 may associate a survey token to the survey, and thus link the respondent to the survey. In the instance that the survey system 102 has multiple outgoing numbers, the survey system 102 can maintain a record of each survey in which the respondent is participating.

In a similar manner, the survey system 102 can also use the results database 210 to maintain a record of a respondent's progress within a survey. In particular, the results database 210 may store the survey question that a respondent is currently answering. For example, if a respondent has completed three out of five questions on a survey, the survey system 102 may include a record in the results database 210 of the participant's current progress. In particular, the survey system 102 may note that the respondent has answered the first two questions, been provided the third question, and has not yet answered the third question or subsequent questions.

As shown in FIG. 2, the surveys 220 may include questions 222 and results 224. More specifically, each survey may include a set of questions 222. The survey system 102 may store the questions grouped by survey. Further, each question may have a unique question identifier (or simply "question ID"). In some cases, the question ID may also identify the survey to which the question belongs. For example, all questions from a particular survey may include the survey ID within the question ID.

Further, each question may be associated with a set of results, or a compilation of answers associated with the question. Accordingly, along with questions 222, the surveys 220 may include results 224. When a respondent provides an answer to a survey question, the survey system 102 may add the answer as part of the results 224. As such, the results 224 may include a cumulative set of answers for a survey question. Further, each result may have a unique results identifier (or simply "result ID"). In some instances, the result ID may identify the survey and/or the question to which the result corresponds. For instance, based on the result ID, the survey system 102 is able to identify the corresponding question and/or the survey.

Figure 3:
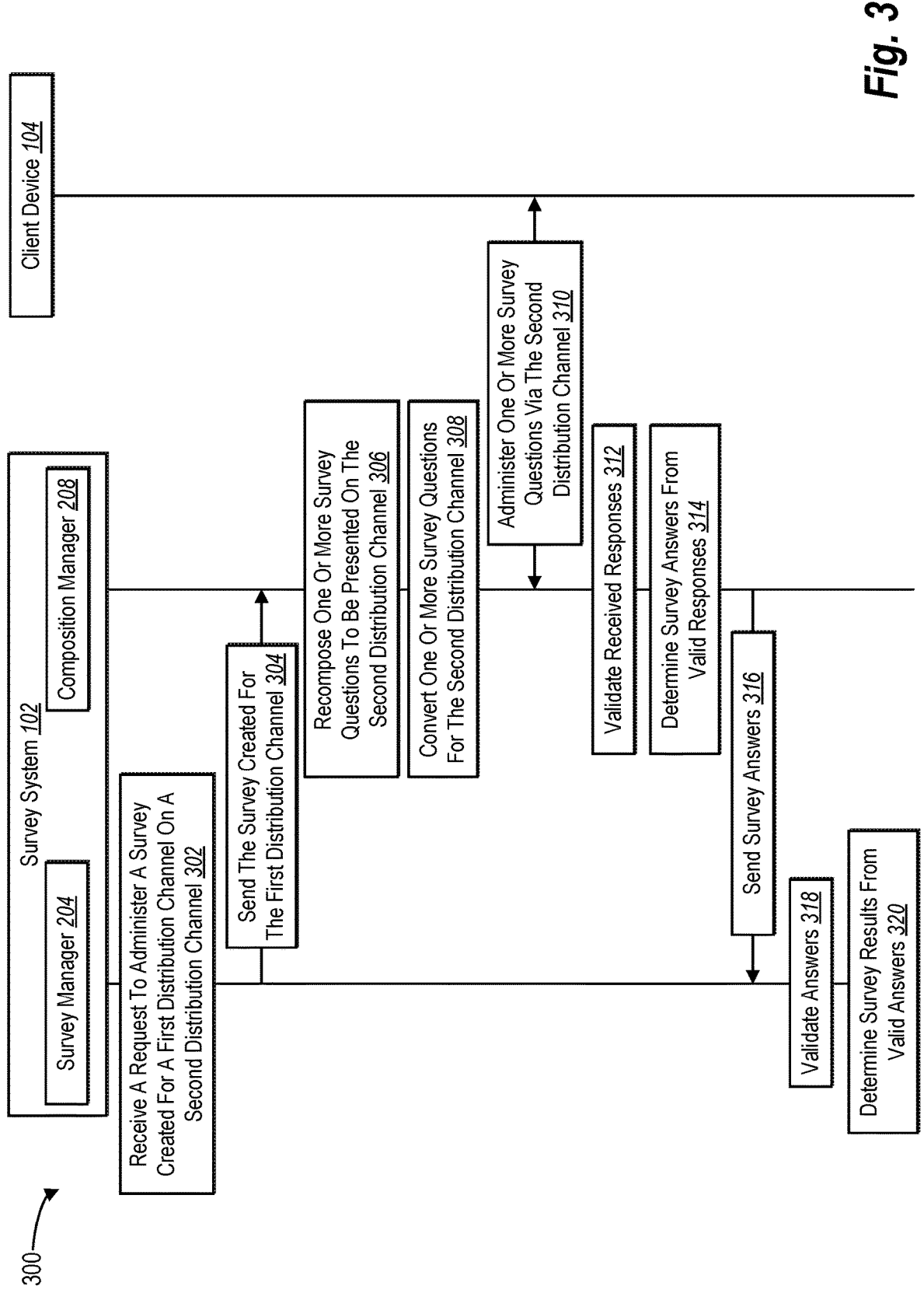
FIG. 3 illustrates a sequence-flow method showing the survey system administrating a survey to a client device in accordance with one or more embodiments.

FIG. 3 illustrates a sequence-flow method 300 showing the survey system 102 administrating a survey to a client device 104. The survey system 102 and the client device 104 shown in FIG. 3 may each be example embodiments of the survey system 102 and the client device 104 described with regard to FIG. 1. Further, as shown in FIG. 3, the survey system 102 may include a survey manager 204 and a composition manager 208. The survey manager 204 and the composition manager 208 shown in FIG. 3 may be example embodiments of the survey manager 204 and the composition manager 208 described in connection with FIG. 2.

As shown in FIG. 3, the survey system 102 may receive a request to administer a survey. In particular, as shown in step 302, the survey manager 204 may receive a request to administer a survey created for a first distribution channel on a second distribution channel. For example, a user may request that the survey system 102 administer a survey created as an online survey via text message.

In step 304, the survey manager 204 may send the survey created for the first distribution channel to the composition manager 208. In particular, the survey manager 204 may detect that the user wants to administer the survey on a distribution channel other than the distribution channel for which the survey was created, and as a result, may send the survey over to the composition manager 208 to recompose one or more survey questions. For instance, the survey manager 204 may send the survey over to the composition manager 208 to recompose the survey questions for presentation on the second distribution channel via text message, such as SMS or instant messaging.

Upon receiving the survey, the composition manager 208 may recompose one or more survey questions to be presented on the second distribution channel, as step 306 illustrates. More specifically, the composition manager 208 may determine whether a survey question in the survey is currently suitable for the second distribution channel. Additionally, the composition manager may determine, based on the survey question type, that a recomposed survey question may enable a respondent to better answer the survey question. As described above, the composition manager 208 may determine whether to recompose a survey question based on the question type of the survey question and/or based on the type of available answer choice (e.g., numerical answers) for the survey question. Additionally, as descried above, in some example embodiments, the composition manager 208 may recompose a single survey question into multiple recomposed survey questions.

Based on the determination to recompose a survey question within the survey, the composition manager 208 may recompose the survey question to be presented on the second distribution channel. For instance, the composition manager 208 may recompose a survey question to be presented via text message, as described above. Further examples of recomposing survey questions are provided below in connection with FIGS. 5A-8B.

In some example embodiments, a survey question needs to be converted from a first protocol format to a second protocol format before the survey question can be sent via the second distribution channel. In particular, if the survey system 102 is sending a survey question (including a recomposed survey question) via text message, the survey system 102 may need to convert the survey question to another protocol, such as SMS. As step 308 illustrates, the survey system 102 may convert one or more survey questions for the second distribution channel. Further, as described above, in one or more embodiments, the survey system 102 may employ a third-party service to convert and distribute the survey questions via text message.

After recomposing and/or converting the protocol of the survey question, the survey system 102 may administer the survey to one or more respondents. In particular, as shown in step 310, the composition manager 208 may administer one or more survey questions via the second distribution channel to the client device 104. For instance, the composition manager 208 may send a text message including a survey question or a recomposed survey question to a respondent associated with the client device 104. While FIG. 3 illustrates one client device 104, the composition manager 208 may send, via text message, one or more survey questions to multiple respondents associated with multiple client devices.

As part of administering the survey via the second distribution channel in step 310, the survey system 102 may receive responses from the client device 104. More specifically, the composition manager 208 may receive a response from the client device 104 via text message. The response may include an answer to the recomposed survey question previously sent to the client device 104. As illustrated in step 312, the composition manager 208 may validate the received responses to the one or more survey questions. As briefly described above, the composition manager 208 may confirm that a response is not blank or empty, that the response corresponds to an active survey, and that the response includes an available answer. Further, FIG. 4, which is described below, provides a more detailed example of validating responses received from respondents.

After validating the responses received from the client device 104, the composition manager 208 may determine survey answers from the valid responses, shown in step 314. For example, as described above, the composition manager 208 may determine if a response includes a direct answer to a survey question, or an indication of an answer to a recomposed survey question. To illustrate, if the survey system 102 sent a non-recomposed survey question to a respondent, then the response can contain a direct answer to the survey question. In contrast, however, if the survey system 102 sent a recomposed survey question to a respondent, the response may contain an indication of an answer to the recomposed survey question, which serves as an indication of the actual answer to the survey question.

For example, if the recomposed survey question includes available recomposed answer choices, which append number or letters to the available answer choice of the survey question, the respondent may include a number or letter in their response. As such, the number or letter in the response serves as an indication of one of the available answer choices to the survey question. The composition manager 208 may use the indication of the recomposed survey question to determine the answer to the survey question. In some example embodiments, a response to a recomposed survey question may include an actual answer to the survey question, as described above. In any case, the composition manager 208 may analyze a valid response, and determine a survey answer from the response.

In step 316, the composition manager 208 may send survey answers to the survey manager 204. In some cases, the composition manager 208 may store the answers in a database, such as a results database. When this occurs, the composition manager 208 may send an indication to the survey manager 204 that the answers to one or more survey questions are stored in the results database. In other cases, the composition manager 208 may send answers individually to the survey manager 204 as the answers are received. Alternatively, the composition manager 208 may collect a plurality of answers to various survey questions before sending the answers to the survey manager 204.

The survey manager 204 may validate answers corresponding one or more survey questions, as step 318 illustrates. For example, the survey manager 204 can verify that, depending on the survey question, the correct number of answers is given. Further, the survey manager 204 may verify that the answers provided by the composition manager 208 satisfy the one or more survey questions to which they correspond.

As illustrated in step 320, after validating the one or more answers, the survey manager 204 may determine survey results from the valid answers. As described above, the survey manager 204 may compile numerous answers to a survey question into results for the survey question. Using the results for each survey question, the survey manager 204 can present the results to a user that created the survey or that is reviewing the survey results. Further, as described above, the survey manager 204 may present results to each survey question, or the survey as a whole, regardless of the distribution channel used to administer the one or more survey questions, or if the one or more survey questions were provided to different respondents via different distribution channels.

FIG. 4 illustrates a sequence-flow method 400 showing the survey system 102 validating responses to a survey question received from a client device 104. The survey system 102 and the client device 104 shown in FIG. 4 may each be example embodiments of the survey system 102 and the client device 104 described with regard to FIG. 1. Further, as shown in FIG. 4, the survey system 102 may include a composition manager 208. The composition manager 208 shown in FIG. 4 may be an example embodiment of the composition manager 208 described in connection with FIG. 2.

Additionally, the steps in FIG. 4 may provide additional explanation and detail to the steps described in connection with FIG. 3. In particular, the steps in FIG. 4 may, in some example embodiments, correspond to step 310 (i.e., administering one or more survey questions via the second distribution channel), step 312 (i.e., validating received responses), and step 314 (i.e., determining survey answers from the valid responses).

To illustrate, step 402 in FIG. 4 illustrates the composition manager 208 of the survey system 102 sending a recomposed survey question to the client device 104 via the second distribution channel. For instance, the composition manager 208 may send the recomposed survey question via text message to a respondent associated with the client device 104. The respondent may receive the recomposed survey question and provide a response. Accordingly, the client device 104 may send a response to the recomposed survey question back to the composition manager 208. As shown in step 404, the composition manager 208 may receive a response to the recomposed survey question from the client device 104.

Upon receiving the response to the recomposed survey question, the composition manager 208 may identify a survey associated with the response, illustrated in step 406. As such, the survey system 102, in particular, the composition manager 208, can identify with which survey a response is associated. Further, because each response is received independently, the survey system 102 can identify which survey a response corresponds each time the survey system 102 receives a response.

To identify the survey to which a text message response corresponds, the composition manager 208 may use information gathered from the response, such as the respondent's address (e.g., the address or phone number of the client device 104) and the survey system's address (e.g., the address or number of the survey system 102). Using the address information, the composition manager 208 may generate or identify a survey token. The composition manager 208 may provide the survey token to the survey system 102 and the survey system 102 may return the survey ID of the survey associated with the response. In particular, the survey system 102, upon receiving the survey token, may look up the survey token in a database, such as the results database described above, and may identify the survey ID and, in some cases, the respondent associated with the survey token.

In one or more embodiments, the survey system 102 may provide an indication to the composition manager 208 that the survey associated with the survey token is active. Alternatively, the survey system 102 may indicate that the survey token is associated with an expired, inactive, or closed survey. Additionally, the survey system 102 may indicate to the composition manager 208 that the survey token does not correspond to a known survey on the survey system 102. Based on the information provided by the survey system 102, the composition manager 208 may continue validating the response, or send a message to the client device 104 indicating that the response does not correspond to an active or valid survey.

As briefly described above, the survey system 102 may use multiple addresses in connection with a distribution channel. For example, the survey system 102 may use a plurality of short code numbers and/or long code numbers to send out survey questions and receive responses. If the survey system 102 uses a different outgoing address each time it sends out a different survey, each survey token can correspond to a survey and will not overlap.

If, however, the survey system 102 is limited in the number of addresses through which it can administer multiple surveys (e.g., the survey system 102 on has a single address), the survey system 102 can send different surveys to a respondent using the same outgoing and destination numbers. As a result, the survey token consisting of the survey system's address and the respondent's address may refer to multiple surveys and the survey token could no longer be used to identify a particular survey. As one solution to this issue, the survey system 102 may limit the number of surveys in which a respondent can simultaneously participate to the number of outgoing addresses the survey system 102 has per distribution channel. For example, if the survey system 102 has five text messaging numbers, the survey system 102 may limit a respondent to participating in only five surveys at one time. If the survey system 102 has one text messaging number, the survey system 102 may limit a respondent's participation to only one survey at one time. In this manner, if the respondent desires to participate in an addition survey, the respondent must finish or quit an existing survey.

As another solution, the survey system 102 may request that the respondent include a unique identifier in each response. For example, a respondent often sends an access code to the survey system 102 to initiate a survey via text message, such as the access code "survey" or "demo" (e.g., "Text 'survey' to 55555 to take a short survey"). In response, the survey system 102 initiates a survey with the respondent via text message. In one or more embodiments, the survey system 102 may also request that a respondent provide the access code, or another identifier code, with each response. For instance, the survey system 102 may, for example, request that a respondent include "S1" in each response to indicate to the survey system 102 that the response corresponds to Survey1. In this manner, the survey system 102 may use the identifier code along with the sender's address and the respondent's address to create a survey ID and identify the survey to which a response corresponds. Further, the survey system 102 may use the same outgoing address to maintain multiple surveys with a respondent at the same time.

In the event that the survey system 102 requests that a respondent include the access code or another identifier code in a text message response, the composition manager 208 can include the identifier code in each question as a reminder to the respondent to include the code. Further, the composition manager 208 may send a text message back to a respondent when a response does not include the identifier code. For instance, the composition manager 208 may send a message saying, "I'm not sure what question you are trying to answer. Please resend your answer along with the survey code shown in the question."

In yet another alternative embodiment, the composition manager 208 may recompose questions such that the selected recomposed answer is unique to all other possible answers in the survey system 102. For example, if a survey question has three available answer choices, the composition manager 208 may recompose each of the available answer choices into available recomposed answer choices that are coded based on the survey ID, question ID, and available answer choice. In this manner, the composition manager 208 may use the response to identify the survey to which the response corresponds, the current question the respondent is answering, and the answer the respondent selected. While this approach may not be ideal for surveys administered via text message, this approach may be beneficial for surveys administered via alternative distribution channels.

Returning to FIG. 4, once the composition manager 208 has identified the survey to which the response corresponds, the composition manager 208 may then identify the question associated with the identified survey, as step 408 illustrates. For example, the composition manager 208 may provide the survey ID and the survey token to the survey system 102, and the survey system 102 may return the survey question to which the respondent is currently responding. To illustrate, the survey system 102 may use the survey ID and the survey token to look up in a database, such as the results database, the question the respondent is currently answering, and return the question to the composition manager 208.

In some additional or alternative cases, the survey system 102 may return the recomposed survey question to the composition manager 208. For example, upon identifying the survey question associated with the response, the survey system 102 may also identify that the response was received via the second distribution channel. Further, the survey system 102 may identify a corresponding recomposed survey question associated with the survey question that has been recomposed for the second distribution channel. Accordingly, the survey system 102 may send the recomposed survey question to the composition manager 208 upon identifying the composed survey question. Alternatively, rather than receiving the recomposed survey question from the survey system 102, the composition manager 208 may use the survey question received from the survey system 102 and recompose the survey question, as described above.

Using the identified question, the composition manager 208 can determine if the received response is valid for the identified survey question, as shown in step 410. More specifically, the composition manager 208 may determine if the response contains an answer to the recomposed survey question. In some example embodiments, the composition manager 208 may compare the response to the available recomposed answer choices to determine whether the response matches one of the available recomposed answer choices.

If the composition manager 208 does not identify a match, the composition manager 208 may determine that the response is not valid for the identified question. Based on the composition manager 208 detecting an invalid response, the composition manager 208 may send a message to the client device 104 indicating an invalid response, as step 412 illustrates. The message may be a text message and may provide the respondent an opportunity to re-respond to the recomposed survey question. In some cases, the composition manager 208 may resend the recomposed survey question to the client device 104. When the respondent again replies, the composition manager 208 may receive an updated response to the recomposed survey question, as shown in step 414. The composition manager 208 may again validate the response (e.g., repeat steps 406-410).

In some additional embodiments, the composition manager 208 may interact with the respondent to arrive at a valid answer. To illustrate, the recomposed survey question may prompt the respondent to enter a date. The recomposed survey question may allow the respondent to enter "Today," "Yesterday," or manually input a date. If the composition manager 208 receives a response that says "March 15," the composition manager 208 may send a follow up message asking the respondent to enter a year or to confirm that the full date is "Mar. 15, 2015." Once the composition manager 208 confirms the date with the responded, the composition manager 208 may determine that the response is valid.

As step 416 illustrates, based on the composition manager 208 determining that the response is valid, the composition manager 208 may determine an answer to the survey question. As described above, the composition manager 208 may use the answer to the recomposed survey question to determine the answer to the survey question. For example, the composition manager 208 may use the mapping between the available answer choices of the survey question and the available recomposed answer choices of the recomposed survey question to identify the answer to the survey question selected by the respondent.

FIG. 5A illustrates an example multiple choice survey question 502 composed for presentation on a first distribution channel. In particular, the multiple choice survey question 502 in FIG. 5A includes a question 502a and available answer choices 502b. For purposes of explanation, the multiple choice survey question 502 has the answer "neutral" selected.

A user may compose the multiple choice survey question 502 using tools provided by a survey system. For example, the survey system may provide online-based tools that help the user created a survey and compose survey questions. The survey system may allow a user to compose survey questions for a first distribution channel (e.g., online distribution via a website), such as the survey question shown in FIG. 5A even when the user selects an option to have the survey system to administer the survey via a second distribution channel (e.g., via text message). If the user selects the option to administer the survey via a second distribution channel, the survey system may automatically recompose the survey question 502 to be presented via the second distribution channel.

FIGS. 5B-5F illustrate examples of recomposed survey questions 504-512 for presentation on a second distribution channel. In particular, FIG. 5B illustrates a recomposed survey question 504 where the question 504a is the same as the question 502a in the survey question 502 shown in FIG. 5A. The available recomposed answer choices 504b in FIG. 5B may also correspond to the available answer choices 502b shown in FIG. 5A. The available recomposed answer choices 504b, however, may also include numbers associated with each of the available answer choices 502b of the survey question 502. For example, the first available recomposed answer choice is "1—very satisfied." To answer the recomposed survey question 504, a respondent need only respond with the number "1" to indicate the answer of "very satisfied."

In some example embodiments, in addition to associating number or letters with available answer choices, the survey system may modify the question and/or available answer choices of a recomposed survey question. For example, FIG. 5C illustrates a recomposed survey question 506 where the available recomposed answer choices 506b have been truncated. In particular, the survey system removes qualifier words like "somewhat" or "very."

In some instances, the survey system may additionally, or in the alternative, modify the question 506a as well. For instance, the survey system may modify a recomposed survey question to fit within a text message. For example, some text message protocols, such as SMS, limit text messages to 160 characters. Other protocols may limit messages to more or less characters. Further, the survey system may truncate a question or available recomposed answer choices with a recomposed survey question to better ensure that the recomposed survey question fits within the display of a client device. Displays on some client devices may be smaller in size, and thus, a shorter recomposed survey question may better suit these client devices.

As shown in the recomposed survey question 508 of FIG. 5D, the survey system may omit one or more available recomposed answer choices 508b. For example, the survey system may omit the intermediary available answer choices of "somewhat satisfied" and "somewhat dissatisfied." In some example embodiments, the survey system may allow a respondent to provide a response of "2" or "4" and the survey system will map those responses to "somewhat satisfied" and "somewhat dissatisfied" respectively. In other embodiments, the survey system may only allow the responses "1," "3," and "5." In still other embodiments, when recomposing the survey question, the survey system may remove the available answer choices of "somewhat satisfied" and "somewhat dissatisfied," and then provide available recomposed answer choices of "1-satisfied," "2-neither," and "3-dissatisfied."

In one or more embodiments, the survey system may recompose a survey question by folding the available answer choices into the survey question. To illustrate, the recomposed survey question 510 in FIG. 5E displays the question 510a, which has incorporated the available answer choices 510a, into the question 510a. While folding in the available answers into the question 510a may appear to change the question type, the survey system may properly associate the response to the recomposed survey question 510 to an available answer choice 502b of the survey question 502 even though the survey question 502 and the recomposed survey question 510 are different question types.

In some cases, incorporating the available answer choices 502b from the survey question 502 into the question may reduce the overall length of the question. In other cases, however, shortening the question 510a too much may lead to confusion for a user or may change the outcome of the answer. For example, depending on the available answer choices in the survey question, incorporating the available answer choices into the question may change the nature of the question such that the respondent is prompted to provide a response that does not map to one of the available answer choices.

In some example embodiments, the survey system may remove or change available answers from a survey question altogether when recomposing the survey question. For example, if a survey question is "What type of pets do you own?" and the available answer choices are "dog," "cat," "bird," and "fish," the survey system may recompose the survey question to "What type of pets do you own?" If the respondent includes one of the available answer choices in their response, the survey system may use those provided answer to update the results of the survey question. Otherwise, the survey system may dismiss or otherwise store the answers provided by the respondent (e.g., as an "other" option or as the actual answer provided).

In some example embodiments, the survey system may first provide the recomposed survey question 510 shown in FIG. 5E to a respondent. If the respondent does not provide a valid response, or requests help from the survey system in responding to the recomposed survey question 510, the survey system may provide another recomposed survey question for the same survey question, such as the recomposed survey question 504 shown in FIG. 5B or the recomposed survey question 504 shown in FIG. 5C.

In one or more additional embodiments, the survey system may recompose a survey question by replacing available answer choice with substitute available recomposed answer choices. As shown in FIG. 5F, the survey system may replace the available answer choice 502b of the survey question 502 in a recomposed survey question 512 with numbers and/or graphics. Respondents are commonly using graphics or symbols, such as emojis, smileys, and ideograms in text messages. In many cases, a respondent's client device will automatically display graphics in place of certain strings of text (e.g., converts ":)" into a smiley face graphic). Accordingly, the survey system may recompose a survey question and allow a respondent to answer the recomposed survey question using graphics.

FIG. 6A illustrates an example matrix survey question 602 composed for presentation on a first distribution channel. The matrix survey question 602 includes a question 602a and available answer choices 602b. Further, the matrix survey question 602 is composed for a respondent to answer via a first distribution channel, such as part of an online survey. When a respondent answers the matrix survey question 602 via the first distribution channel, the respondent may rate, using available answer choices 602b, multiple aspects of the question 602a at one time. As described above, if a user desires to provide a matrix question via a second distribution channel, such as text message, the survey system may be unable to provide the matrix survey question to a respondent.

FIG. 6B illustrates an example of recomposed survey questions 604-608 for presentation on a second distribution channel. As shown in FIG. 6B, the survey system may recompose the matrix survey question 602 of FIG. 6A by separating the matrix survey question 602 into multiple recomposed survey questions 604-608. By separating the survey question 602 into three recomposed survey questions 604-608, the survey system may now distribute the recomposed survey questions 604-608 via the second distribution channel (e.g., via text message).

As shown in FIG. 6B, the multiple recomposed survey questions 604-608 may break down the question 602a in the survey question 602 of FIG. 6A into separate recomposed questions 604a, 606a, and 608a. In addition, the multiple recomposed survey questions 604-608 may also recompose the available answer choices 602b into available recomposed answer choices 604b, 606b, 608b, as described above, to include numbers to allow a respondent to simply and easily respond to each recomposed survey question 604-608. For example, in recomposed survey question 604, the available recomposed answer choices 604b include "1-satisfied," "2-neutral," and "3-dissatisfied."

When the survey system recomposes a survey question into multiple recomposed survey questions for presentation on a second distribution channel, the survey system may send each recomposed survey question individually. For example, the survey system may send the first recomposed survey question 604 via text message to a respondent. Once the survey system receives a reply, the survey system may send the second recomposed survey question 606 to the respondent, and so forth. When all the recomposed survey questions for a survey question are received and validated, the survey system may determine the answer(s) to the survey question and update the results for the survey question.

FIG. 7A illustrates an example multiple selection survey question 702 composed for presentation on a first distribution channel. As shown in FIG. 7A, the multiple selection survey question 702 may include a question 702a and available answer choices 702b. Further, the multiple selection survey question 702 is composed for a respondent to answer via a first distribution channel, such as part of an online survey. When responding to the multiple selection survey question 702, a respondent may select multiple answers from the available answer choices 702b. In some cases, a respondent may select all of the available answer choices 702b.

As briefly described above, the survey system may recompose the multiple selection survey question 702 for distribution on a second distribution channel. For example, FIGS. 7B-7C illustrate examples of recomposed survey questions 704-710 for presentation on a second distribution channel (e.g., via text message). More specifically, as shown in the recomposed survey question 704 of FIG. 7B, the survey system may recompose the multiple selection survey question 702 by rewriting the question 702a into a recomposed question 704a, and assigning numbers to each of the available answer choices 702a as part of the available recomposed answer choices 704b.

As an alternative, the survey system may separate the multiple selection survey question 702 into separate recomposed survey questions 706-710 for each available answer choice 702a, as shown in FIG. 7C. In particular, the survey system may recompose the question 702a into separate recomposed questions 706a, 708a, and 710a. Further, the survey system can recompose the available answer choices 702b into simply yes or no available recomposed answer choices, where a respondent can respond with either the number "1" or "2," or the words "yes" or "no" (shown as available recomposed answer choices 706b, 708b, 710b). In some instances, the survey system may also accept a response of "y" or "n" to the recomposed survey questions.

As with the matrix survey question, the survey system may separate a multiple selection survey question into separate recomposed survey questions. The survey system may send each recomposed survey question and receive a corresponding response before sending the next recomposed survey question. Further, the survey system may wait for valid responses to each recomposed survey question before combining the responses and updating the results for the survey question.

In some example embodiments, whether the survey system separates a multiple selection survey question into separate recomposed survey questions may be based on the number of available answer choices 702b. For example, when the survey question includes less than a threshold of available answer choices (e.g., less than five), the survey system may recompose the survey question into a single recomposed survey question. If the survey question includes more than a threshold of available answer choices (e.g., five or more), the survey system may recompose the survey question into a multiple recomposed survey question. Additionally, the survey system may determine whether to separate a multiple selection survey question into separate recomposed survey questions based on the length of the multiple survey question and the protocols of the selected distribution channel. In some example embodiments, the survey system may separate a multiple survey question into multiple recomposed survey questions, such as multiple recomposed survey questions that are designed like the recomposed survey question 704 illustrated in FIG. 7B.

FIG. 8A illustrates an example heat map survey question 802 composed for presentation on a first distribution channel. The heat map survey question 802 includes a question 802a and an answer area 802b. Further, the heat map survey question 802 is composed for a respondent to answer via a first distribution channel, such as part of an online survey. As described above, the heat map survey question 802 may provide an image 802c that allows a respondent to select a location within the image 802c. To illustrate, as shown in FIG. 8A, the heat map survey question 802 displays an image 802c of a bicycle with the question 802a "Where would you put our company's logo on the product shown below?" and the instruction for the responded to select an area of the image 802c. To respond to the heat map survey question 802, the respondent provides a selection within the answer selection area 804b position where he or she would place the logo.

While the survey system may provide a heat map survey question 802 via certain distribution channels, such as when administering a survey online, the survey system may be unable to present the heat map survey question 802 via another distribution channel, such as via text message. Accordingly, the survey system may recompose the heat map survey question 802 for presentation on a second distribution channel.

To illustrate, FIG. 8B shows an example of a recomposed heat map survey question 804 for presentation on a second distribution channel. For example, the recomposed heat map survey question 804 in FIG. 8B includes a recomposed question 804a and an answer grid 804b. In particular, as shown in FIG. 8B, the recomposed heat map survey question 804 displays an image 802c of a bicycle. Within the recomposed survey question 804, the recomposed question 804a includes a prompt, such as "Where would you put our company's logo on the product shown below?" along with the instruction for the responded to provide coordinates where the respondent would place the logo. The answer grid 804b may display numbers and letters in a grid pattern around the image 804c to allow a respondent to provide an indication of where he or she would place the logo. Accordingly, the survey system may allow a respondent to provide an answer to a heat map question 802 via text message, where the heat map survey question 802 was originally composed for online surveys. Further, the survey system may obtain an answer to the heat map survey question 802 via text message without requiring the user that created the survey to intervene (e.g., rewrite or delete the survey question, or have the survey system skip the survey question when the survey question is provided via the second distribution channel).

Figure 9:
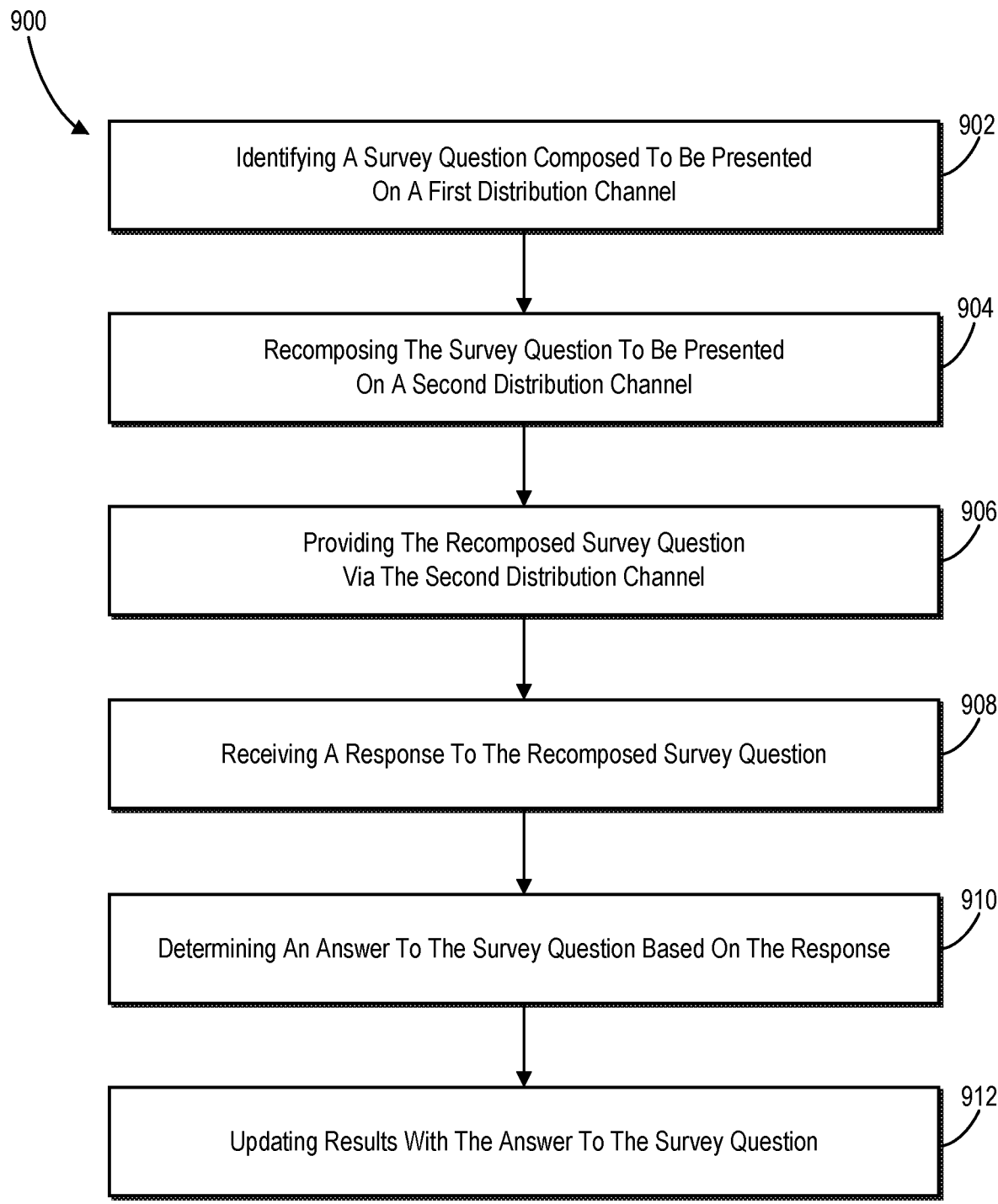
FIG. 9 illustrates a flowchart of an exemplary method for distributing a survey via an additional distribution channel in accordance with one or more embodiments.
Figure 10:
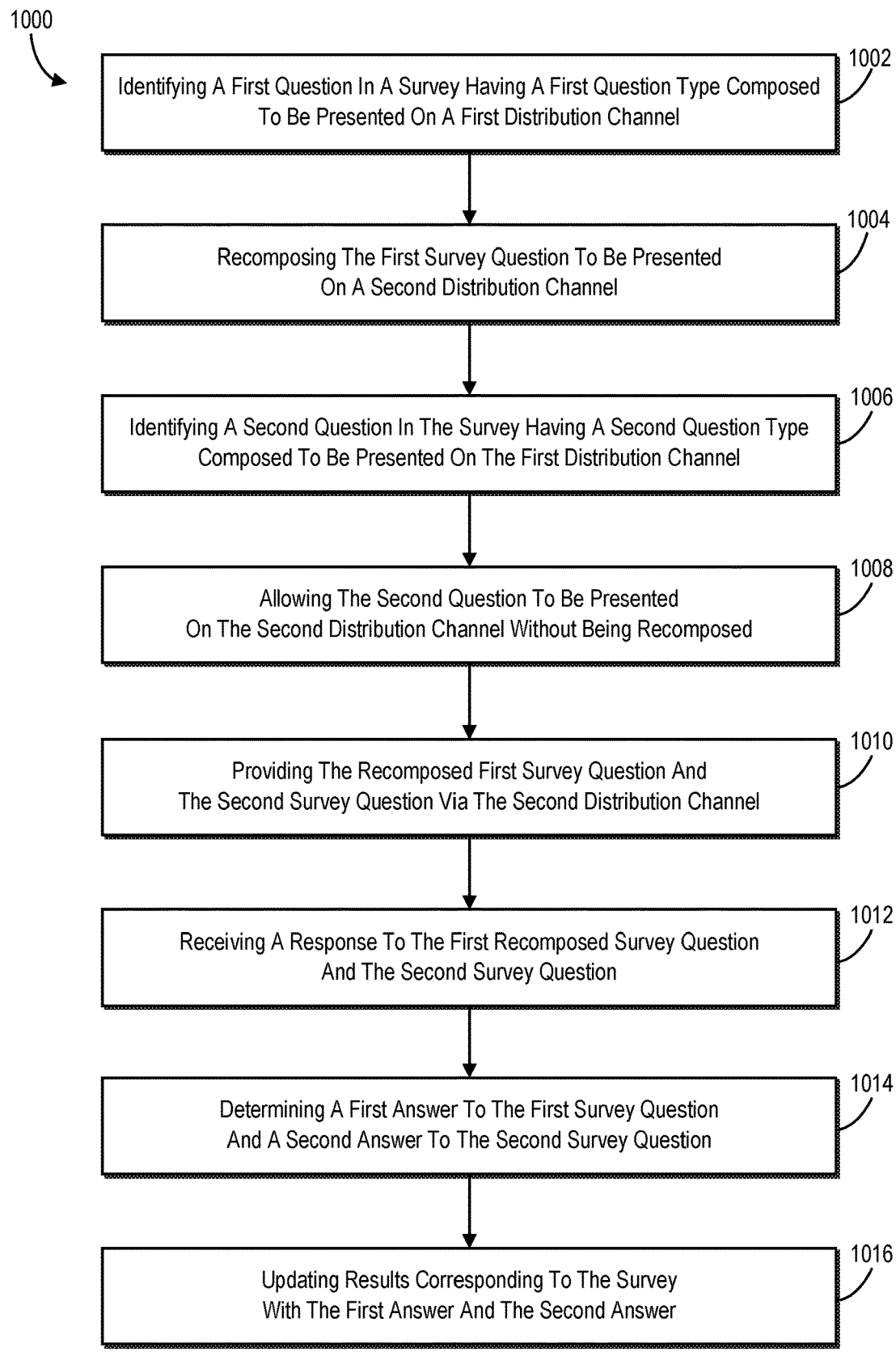
FIG. 10 illustrates a flowchart of an exemplary method for recomposing a survey question based on question type in accordance with one or more embodiments.

FIGS. 1-8, the corresponding text, and the examples, provide a number of different systems, devices, and graphical user interfaces for administering survey questions to respondents via a distribution channel other than the distribution channel for which the survey question was created. In addition to the foregoing, embodiments disclosed herein also can be described in terms of flowcharts comprising acts and steps in a method for accomplishing a particular result. For example, FIGS. 9-10 illustrates flowcharts of exemplary methods in accordance with one or more embodiments disclosed herein. The methods described in relation to FIGS. 9-10 can be performed with less or more steps/acts or the steps/acts can be performed in differing orders. Additionally, the steps/acts described herein can be repeated or performed in parallel with one another or in parallel with different instances of the same or similar steps/acts.

FIG. 9 illustrates a flowchart of an exemplary method 900 for distributing a survey via an additional distribution channel. The method 900 can be implemented by the survey system 102 described above. The method 900 involves an act 902 of identifying a survey question composed to be presented via a first distribution channel. In particular, the act 902 may involve identifying a question type of a survey question composed to be presented via a first distribution channel, where the survey question is associated with a survey. In some example embodiments, the first distribution channel may be an online distribution channel. Further, in one or more embodiments, the act 902 may involve identifying whether the survey question is a multiple choice question, a rating scale question, a drop down selection question, a matrix selection question, or an open-ended/open response question.

In addition, the method 900 involves an act 904 of recomposing the survey question to be presented on a second distribution channel. In particular, the act 904 may involve recomposing the survey question to be presented on a second distribution channel based on the identified question type of the survey question. In some instances, the second distribution channel may include text messaging, such as SMS. Further, in one or more embodiments, the act 904 may involve recomposing the survey question into a plurality of recomposed survey questions. In some example embodiments, the act 904 may involve determining whether the survey question is compatible with (e.g., able to be recomposed for) presentation on the second distribution channel.

Further, the method 900 involves an act 906 of providing the recomposed survey question via the second distribution channel. In particular, the act 906 may involve providing, to a client device 104 associated with a respondent, the recomposed survey question via the second distribution channel. For example, the act 906 may involve the survey system 102 sending the recomposed survey question to a client device 104 via text message.

The method 900 also involves an act 908 of receiving a response to the recomposed survey question. In particular, the act 908 may involve receiving, from the client device 104 and via the second distribution channel, a response to the recomposed survey question. In some example embodiments, receiving the response to the recomposed survey question from the client device 104 and via the second distribution channel may involve receiving a plurality of responses corresponding to the plurality of recomposed survey questions.

The method 900 involves an act 910 of determining an answer to the survey question based on the response. In particular, the act 910 may involve determining an answer to the survey question based on the received response to the recomposed survey question. In one or more embodiments, the act 910 may involve determining that the response to the recomposed survey question includes a selected recomposed answer from the plurality of available recomposed answer choices, and further involve identifying the answer to the survey question that corresponds to the selected recomposed answer of the recomposed survey question.

The method 900 involves an act 912 of updating results with the answer to the survey question. In particular, the act 912 may involve updating results corresponding to the survey with the answer to the survey question. For example, the act 912 may include a survey system 102 updating the results for the survey question and presenting the results to one or more survey reviewers.

In addition, the method 900 may involve an act of validating a received response, and based on the received response not satisfying the validation, sending a message to the client device 104 associated with the respondent to respond to the recomposed survey question with a valid response. In some example embodiments, the method 900 may involve an act of determining that the survey question does not need to be recomposed before being sent to the respondent via the second distribution channel based on the identified question type of the survey question.

In one or more embodiments, the method 900 may include the act of determining that the survey question comprises a plurality of available answer choices. In these embodiments, the method 900 may also involve mapping the plurality of available answer choices in the survey question to a plurality of available recomposed answer choices in the recomposed survey question, where the plurality of available recomposed answer choices are each unique and/or sequential numbers.

In some example embodiments, the method 900 may involve the act of validating the response to the recomposed survey question. Upon validating the response to the recomposed survey question and determining the answer to the survey question, the method 900 may also involve identifying an additional survey question associated with the survey. Further, based on the identified question type of the additional survey question, the method 900 may involve recomposing the additional survey question to be presented on the second distribution channel, and providing, to the client device associated with the respondent, the additional recomposed survey question via the second distribution channel.

FIG. 10 illustrates a flowchart of an exemplary method 1000 for recomposing a survey question based on question type. The method 1000 can be implemented by the survey system 102 described above. The method 1000 involves an act 1002 of identifying a first question in a survey having a first question type composed to be presented on a first distribution channel. In particular, the act 1002 may involve identifying a first question in a survey having a first question type, the first question being composed to be presented on a first distribution channel. In some example embodiments, the first distribution channel may be an online distribution channel.

The method 1000 also involves an act 1004 of recomposing the first survey question to be presented on a second distribution channel. In particular, the act 1004 may involve recomposing the first survey question to be presented on a second distribution channel based on the first question being identified as the first question type. The act 1004 may involve recomposing the first survey question to be presented on a second distribution channel in any suitable manner as described herein. In some example embodiments, the second distribution channel may include text messaging, such as SMS and instant messaging.

Further, the method 1000 involves an act 1006 of identifying a second question in the survey having a second question type composed to be presented on the first distribution channel. In particular, the act 1006 may involve identifying a second question in the survey having a second question type, the second question being composed to be presented on the first distribution channel.

Additionally, the method 1000 involves an act 1008 of allowing the second question to be presented on the second distribution channel without being recomposed. In particular, the act 1008 may involve allowing the second question to be presented on the second distribution channel without being recomposed based on the second question being identified as the second question type. For instance, the act 10008 may involve the survey system sending a survey question via text message without recomposing the survey question.

The method 1000 also involves an act 1010 of providing the recomposed first survey question and the second survey question via the second distribution channel. In particular, the act 1010 may involve providing, to a client device 104 associated with a respondent, the recomposed first survey question in a first communication via the second distribution channel and the second survey question in a second communication via the second distribution channel. For example, the first communication and the second communication may each include a text message.

In addition, the method 1000 involves an act 1012 of receiving a response to the first recomposed survey question and the second survey question. In particular, the act 1012 may involve receiving, from the client device and via the second distribution channel, a response to the first recomposed survey question and a response to the second survey question. For example, the act 1012 may involve receiving text messages from the client device 104 having responded to the first recomposed survey question and the second survey question.

Further, the method 1000 involves an act 1014 of determining a first answer to the first survey question and a second answer to the second survey question. In particular, the act 1014 may involve based on the received response to the first recomposed survey question and the received response to the second survey question, determining a first answer to the first survey question and a second answer to the second survey question. In some example embodiments, the act 1014 may involve identifying an indication of the first answer in the response to the first recomposed survey question, determining that the indication of the first answer corresponds to the first answer to the first survey question, and identifying the first answer to the first survey question. Further, the act 1014 may involve identifying the response to the second survey question as the second answer.

The method 1000 involves an act 1016 of updating results corresponding to the survey with the first answer and the second answer. In particular, the act 1016 may involve updating results corresponding to the survey with the first answer to the first survey question and the second answer to the second survey question.

In one or more embodiments, the method 1000 may also involve providing, to the client device 104 associated with the respondent and via the second distribution channel, an option to respond to the first question via the first distribution channel. For example, the method 1000 may involve providing a link in a recomposed survey question sent to a respondent via text message to complete the survey or the recomposed survey question via a webpage. Similarly, the method 1000 may involve providing a link in a survey question provided to a respondent via an online survey to complete the survey or the survey question via text message.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
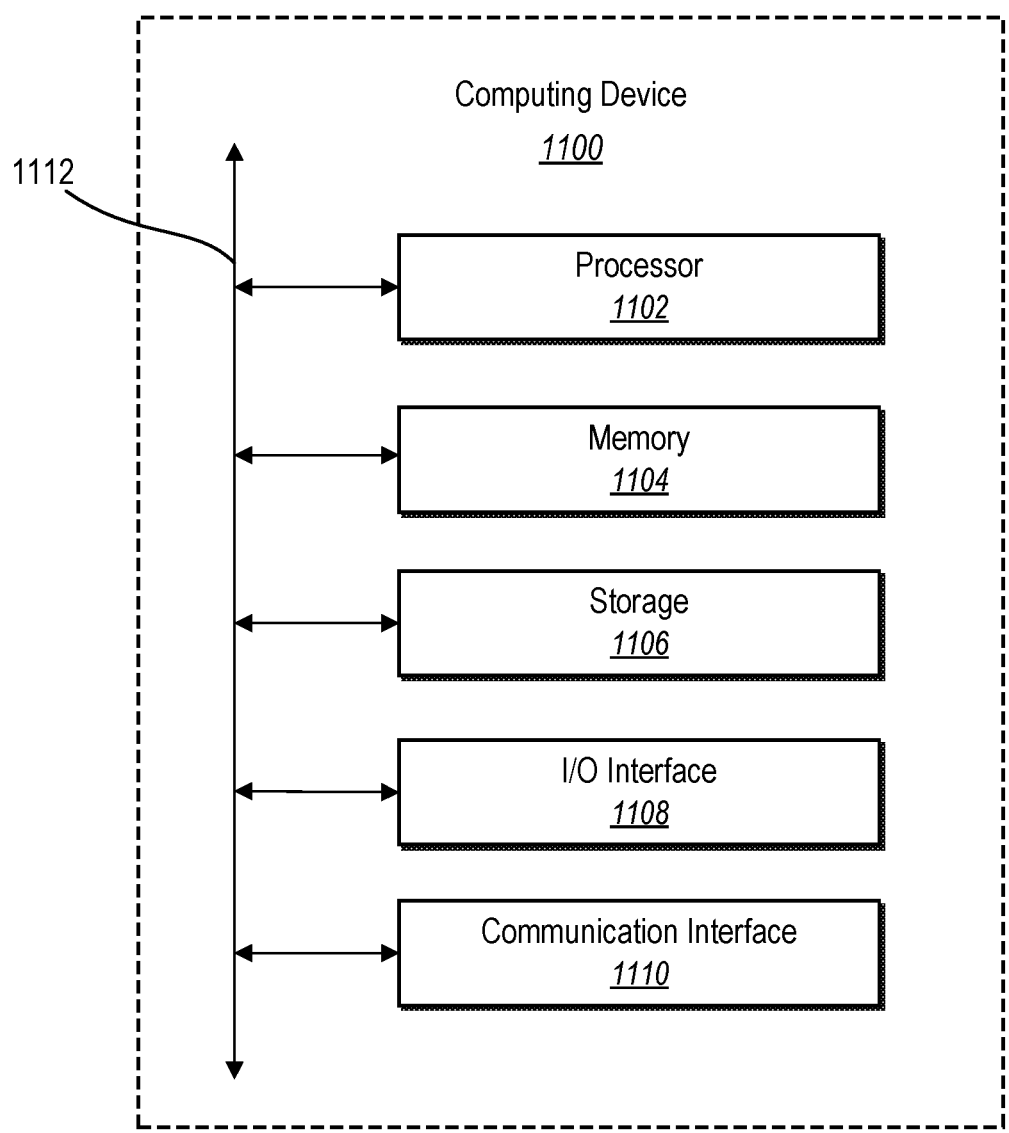
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the survey system 102 and/or client device 104 described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers (TLBs). Instructions in the instruction caches may be copies of instructions in the memory 1104 or the storage 1106.

The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
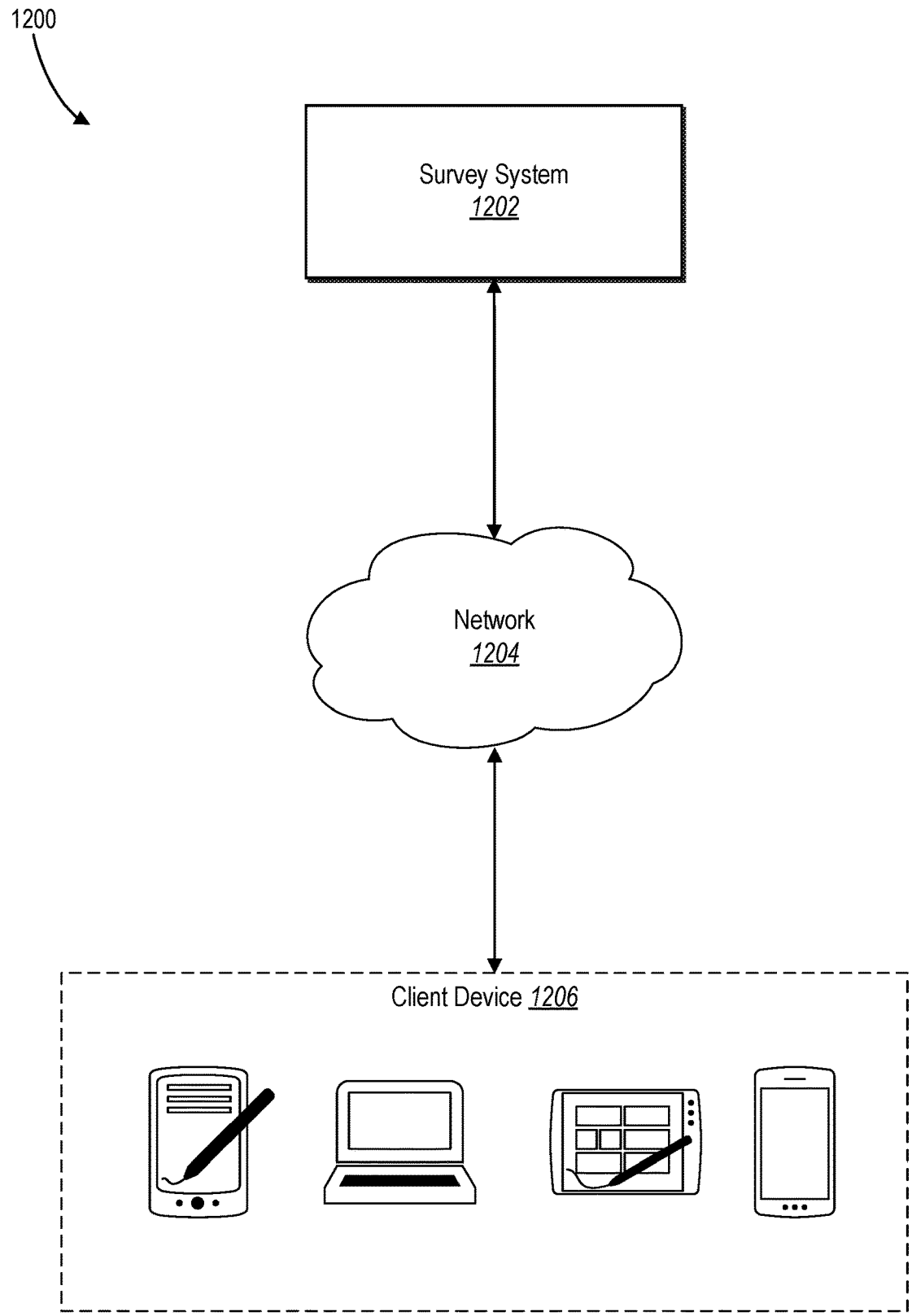
FIG. 12 is an example network environment of a survey system in accordance with one or more embodiments.

FIG. 12 illustrates an example network environment 1200 of a survey system. Network environment 1200 includes a client system 1206, and a survey system 1222 connected to each other by a network 1204. Although FIG. 12 illustrates a particular arrangement of client system 1206, survey system 1222, and network 1204, this disclosure contemplates any suitable arrangement of client system 1206, survey system 1222, and network 1204. As an example and not by way of limitation, two or more of client system 1206, and survey system 1222 may be connected to each other directly, bypassing network 1204. As another example, two or more of client system 1206 and survey system 1222 may be physically or logically co-located with each other in whole, or in part. Moreover, although FIG. 12 illustrates a particular number of client systems 1206, survey systems 1202, and networks 1204, this disclosure contemplates any suitable number of client systems 1206, survey systems 1202, and networks 1204. As an example and not by way of limitation, network environment 1200 may include multiple client system 1206, survey systems 1202, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client system 1206, and survey system 1222 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client system 1206 may be an electronic device including hardware, software, or embedded logic components or a combination of two or more such components and capable of carrying out the appropriate functionalities implemented or supported by client system 1206. As an example and not by way of limitation, a client system 1206 may include any of the computing devices discussed above in relation to FIG. 11. A client system 1206 may enable a network user at client system 1206 to access network 1204. A client system 1206 may enable its user to communicate with other users at other client systems 1206.

In particular embodiments, client system 1206 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 1206 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 1206 one or more Hyper Text Markup Language (HTML) files responsive to the HTTP request. Client system 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, survey system 1222 may include a variety of servers, sub-systems, programs, modules, logs, and data stores. In particular embodiments, survey system 1222 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Survey system 1222 may also include suitable components such as network interfaces, security mechanisms, load balancers, failover servers, management-and-network-operations consoles, other suitable components, or any suitable combination thereof.

In particular embodiments, survey system 1222 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondents, customers, etc.).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
receiving, from an administrator client device, a survey question comprising available answer choices;
modifying, by at least one processor, the survey question by separating a query associated with the survey question into multiple queries to generate multiple recomposed survey questions for distribution through a distribution channel, the multiple recomposed survey questions comprising recomposed answer choices in a response format corresponding to the distribution channel;
mapping the recomposed answer choices in the response format to the available answer choices of the multiple recomposed survey questions;
providing, to a respondent client device and through the distribution channel, the multiple recomposed survey questions comprising the recomposed answer choices;
based on receiving an indication of one or more selections of the recomposed answer choices from the respondent client device, determining one or more responses to the multiple recomposed survey questions by determining one or more answers from the available answer choices that map to the one or more selections of the recomposed answer choices; and
updating results for the multiple recomposed survey questions with the one or more answers.

2. The method of claim 1, wherein the distribution channel is one of: a website distribution channel, an instant messaging distribution channel, an SMS distribution channel, or an email distribution channel.

3. The method of claim 1, wherein:
the available answer choices are associated with a selectable element for use within a website distribution channel; and
the recomposed answer choices are associated with a numerical identifier for use within a messaging distribution channel.

4. The method of claim 1, wherein providing the multiple recomposed survey questions to the respondent client device comprises:

providing, for display within a first presentation of a graphical user interface of the respondent client device, a first recomposed survey question of the multiple recomposed survey questions; and
providing, for display within a second presentation of the graphical user interface of the respondent client device, a second recomposed survey question of the multiple recomposed survey questions, wherein the second presentation differs from the first presentation.

5. The method of claim 4, further comprising:
receiving an indication of a first recomposed answer selection to the first recomposed survey question; and
wherein providing the second recomposed survey question comprises providing, for display within the second presentation of the graphical user interface, the second recomposed survey question after receiving the indication of the first recomposed answer selection to the first recomposed survey question.

6. The method of claim 1, further comprising:
identifying a question type of the survey question; and
determining modifications to the question type of the survey question to generate the multiple recomposed survey questions having a different question type.

7. The method of claim 1, wherein the response format corresponding to the distribution channel is based on a user input type associated with the distribution channel.

8. A non-transitory computer readable storage medium comprising instructions that, when executed by at least one processor, cause a computing device to:
receive, from an administrator client device, a survey question comprising available answer choices;
modify the survey question by separating a query associated with the survey question into multiple queries to generate multiple recomposed survey questions for distribution through a distribution channel, the multiple recomposed survey questions comprising recomposed answer choices in a response format corresponding to the distribution channel;
map the recomposed answer choices in the response format to the available answer choices of the multiple recomposed survey questions;
provide, to a respondent client device and through the distribution channel, the multiple recomposed survey questions comprising the recomposed answer choices;
based on receiving an indication of one or more selections of the recomposed answer choices from the respondent client device, determine one or more responses to the multiple recomposed survey questions by determining one or more answers from the available answer choices that map to the one or more selections of the recomposed answer choices; and
update results for the multiple recomposed survey questions with the one or more answers.

9. The non-transitory computer readable storage medium of claim 8, wherein the distribution channel is one of: a website distribution channel, an instant messaging distribution channel, an SMS distribution channel, or an email distribution channel.

10. The non-transitory computer readable storage medium of claim 8, wherein:
the available answer choices are associated with a selectable element for use within a website distribution channel; and
the recomposed answer choices are associated with a numerical identifier for use within a messaging distribution channel.

11. The non-transitory computer readable storage medium of claim 8, further comprising instructions that, when executed by the at least one processor, cause the computing device to provide the multiple recomposed survey questions to the respondent client device by:
providing, for display within a first presentation of a graphical user interface of the respondent client device, a first recomposed survey question of the multiple recomposed survey questions; and
providing, for display within a second presentation of the graphical user interface of the respondent client device, a second recomposed survey question of the multiple recomposed survey questions, wherein the second presentation differs from the first presentation.

12. The non-transitory computer readable storage medium of claim 11, further comprising instructions that, when executed by the at least one processor, cause the computing device to:
receive an indication of a first recomposed answer selection to the first recomposed survey question; and
provide the second recomposed survey question by providing, for display within the second presentation of the graphical user interface, the second recomposed survey question after receiving the indication of the first recomposed answer selection to the first recomposed survey question.

13. The non-transitory computer readable storage medium of claim 8, further comprising instructions that, when executed by the at least one processor, cause the computing device to determine to separate the query associated with the survey question into the multiple queries based on a number of the available answer choices corresponding to the survey question satisfying a threshold number of available answer choices.

14. The non-transitory computer readable storage medium of claim 8, further comprising instructions that, when executed by the at least one processor, cause the computing device to:
provide the multiple recomposed survey questions to a plurality of respondent client devices through a plurality of different distribution channels; and
provide, to a survey administrator client device, the results to the multiple recomposed survey questions together in a single set for display for all of the different distribution channels used in providing the multiple recomposed survey questions to respondents.

15. A system comprising:
at least one processor; and
at least one non-transitory computer readable storage medium storing instructions thereon that, when executed by the at least one processor, cause the system to:
receive, from an administrator client device, a survey question comprising available answer choices;
modify the survey question by separating a query associated with the survey question into multiple queries to generate multiple recomposed survey questions for distribution through a distribution channel, the multiple recomposed survey questions comprising recomposed answer choices in a response format corresponding to the distribution channel;
map the recomposed answer choices in the response format to the available answer choices of the multiple recomposed survey questions;
provide, to a respondent client device and through the distribution channel, the multiple recomposed survey questions comprising the recomposed answer choices;
based on receiving an indication of one or more selections of the recomposed answer choices from the respondent client device, determine one or more responses to the multiple recomposed survey questions by determining one or more answers from the available answer choices that map to the one or more selections of the recomposed answer choices; and
update results for the multiple recomposed survey questions with the one or more answers.

16. The system of claim 15, wherein the distribution channel is one of: a website distribution channel, an instant messaging distribution channel, an SMS distribution channel, or an email distribution channel.

17. The system of claim 15, wherein:
the available answer choices are associated with a selectable element for use within a website distribution channel; and
the recomposed answer choices are associated with a numerical identifier for use within a messaging distribution channel.

18. The system of claim 15, further comprising instructions that, when executed by the at least one processor, cause the system to provide the multiple recomposed survey questions to the respondent client device by:
providing, for display within a first presentation of a graphical user interface of the respondent client device, a first recomposed survey question of the multiple recomposed survey questions; and
providing, for display within a second presentation of the graphical user interface of the respondent client device, a second recomposed survey question of the multiple recomposed survey questions, wherein the second presentation differs from the first presentation.

19. The system of claim 18, further comprising instructions that, when executed by the at least one processor, cause the system to:
receive an indication of a first recomposed answer selection to the first recomposed survey question; and
provide the second recomposed survey question by providing, for display within the second presentation of the graphical user interface, the second recomposed survey question after receiving the indication of the first recomposed answer selection to the first recomposed survey question.

20. The system of claim 15, further comprising instructions that, when executed by the at least one processor, cause the system to:
determine to separate the query associated with the survey question into the multiple queries based on a number of the available answer choices corresponding to the survey question satisfying a threshold number of available answer choices.

* * * * *